US010187635B2

(12) United States Patent
Sevostianov

(10) Patent No.: US 10,187,635 B2
(45) Date of Patent: Jan. 22, 2019

(54) METHOD AND SYSTEM FOR DISPLAYING THREE-DIMENSIONAL OBJECTS

(71) Applicant: ALT LLC, Moscow (RU)

(72) Inventor: Petr Vyacheslavovich Sevostianov, Voronezh (RU)

(73) Assignee: ALT LLC, Moscow (RU)

( * ) Notice: Subject to any disclaimer, the term of this patent is extended or adjusted under 35 U.S.C. 154(b) by 53 days.

(21) Appl. No.: 15/540,313

(22) PCT Filed: Dec. 31, 2014

(86) PCT No.: PCT/RU2014/001019
§ 371 (c)(1),
(2) Date: Sep. 6, 2017

(87) PCT Pub. No.: WO2016/108720
PCT Pub. Date: Jul. 7, 2016

(65) Prior Publication Data
US 2017/0366805 A1    Dec. 21, 2017

(51) Int. Cl.
*H04N 13/00* (2018.01)
*H04N 13/366* (2018.01)
(Continued)

(52) U.S. Cl.
CPC ........... *H04N 13/366* (2018.05); *G06T 15/08* (2013.01); *H04N 13/15* (2018.05); *H04N 13/30* (2018.05);
(Continued)

(58) Field of Classification Search
USPC .................. 348/42, 51, 53, 56, 61
See application file for complete search history.

(56) References Cited

U.S. PATENT DOCUMENTS 7,259,747 B2    8/2007  Bell
8,902,285 B2 *  12/2014  Tanaka ................. H04N 19/597
                                                    348/43
(Continued)

FOREIGN PATENT DOCUMENTS

RU          118462 U1      7/2012

OTHER PUBLICATIONS

Search Report in PCT/RU2014/001019, dated Sep. 17, 2015.

*Primary Examiner* — Daquan Zhao
(74) *Attorney, Agent, or Firm* — Bardmesser Law Group

(57) ABSTRACT

A system for displaying three-dimensional objects using two-dimensional visualization means simultaneously providing at least effects of binocular parallax and motion parallax, the system comprising: a display configured to display a sequence of images; a pair of glasses configured to provide stereoscopic separation of images, the glasses comprising at least two optical shutters and at least two markers; two optical sensor arrays; two reading and processing devices configured to read data from an area of the optical sensor array and to determine 2D coordinates of the markers; a marker coordinates prediction device configured to extrapolate coordinates of the markers so as effective overall delay does not exceed 5 ms; a marker 3D coordinates calculation device; a 3D scene formation device; and at least one image output device. The invention also includes a corresponding method of displaying three-dimensional objects and provides realistic representation of three-dimensional objects for one or more viewers.

56 Claims, 14 Drawing Sheets

(51) Int. Cl.
*G06T 15/08* (2011.01)
*H04N 13/15* (2018.01)
*H04N 13/327* (2018.01)
*H04N 13/341* (2018.01)
*H04N 13/30* (2018.01)
*H04N 7/18* (2006.01)
*H04N 13/167* (2018.01)

(52) U.S. Cl.
CPC ......... *H04N 13/327* (2018.05); *H04N 13/341* (2018.05); *H04N 13/167* (2018.05)

(56) References Cited

U.S. PATENT DOCUMENTS

| | | | |
|---|---|---|---|
| 2001/0043266 A1* | 11/2001 | Robinson | G02B 27/2264 348/53 |
| 2012/0038635 A1 | 2/2012 | Stamate et al. | |
| 2012/0200676 A1* | 8/2012 | Huitema | H04N 13/378 348/51 |
| 2014/0062556 A1 | 7/2014 | Chen | |
| 2014/0184588 A1* | 7/2014 | Cheng | G06F 3/013 345/419 |

* cited by examiner

METHOD AND SYSTEM FOR DISPLAYING THREE-DIMENSIONAL OBJECTS

CROSS-REFERENCE TO RELATED APPLICATIONS

This application is a U.S. National Phase of PCT/RU2014/001019, filed on Dec. 31, 2014.

BACKGROUND OF THE INVENTION

Field of the Invention

The invention relates to a multi-user means for displaying realistic three-dimensional objects and, in particular, it relates to a means based on monocular and binocular mechanisms of spatial visual perception using a visualization means for providing an image on a screen surface.

Description of the Related Art

Means for displaying three-dimensional objects are used in various virtual reality systems for scientific, industrial, educational, game purposes, etc. When a traditional visualization means (i.e., a means for forming an image on a screen surface, not in a volume of a medium) are used, e.g., means based on substantially flat panels like liquid crystal displays (LCD), plasma panels, projection screens, it is expedient to use methods that utilize as much spatial visual perception mechanisms as possible.

Visual perception mechanisms are classified into monocular and binocular mechanisms and into physiological and psychological ones. Monocular mechanisms include occlusion, recognizability of known object dimensions, motion parallax, linear perspective, texture gradient, shading, and accommodation. Binocular mechanisms include convergence and binocular retinal disparity. Physiological mechanisms include those mechanisms, that may be defined by conceptual and formulaic means in mathematics and physics (motion parallax, accommodation, convergence, and binocular retinal disparity), while psychological mechanisms include those mechanisms, which are based on human perception experience (all other mechanisms). Generally, the physiological spatial perception mechanisms prevail during spatial visualization, while the psychological ones are supplemental.

Occlusion (also known as interposition) is a mechanism assuring depth perception in a situation when one object obstructs view of another object.

Motion parallax is an effect of displacement of image parts relative to each other with an angular velocity being proportional to a difference of distances between the image parts and the viewer, when the mutual position of the viewer and the object under observation changes. This effect is most distinct for moving objects positioned close to the viewer in a motionless environment relative to the viewer.

Recognizability of dimensions is based on a notion of object size in human perception experience, which allows using information of visible size of an object for understanding how far the object is located relative to the viewer.

Linear perspective is an effect of proportional decrease in visible size of objects and distances between them according to the distance to the viewer; this effect provides some impression of depth in two-dimensional images.

Texture gradient is an optical effect, when a perceived texture pattern is modified along with visible size of texture components due to change in the distance between the viewer and the textural surface.

Shading is a decrease in illumination of objects according to an increase of a distance between them and a light source and effect of shadowing some parts of an image by another part of the image. Shading is an important sign of depth perception, as it allows a viewer to judge shape and size of an object without directly observing the object itself, by comparing shape of the surface on which the object casts a shadow, the shape of the shadow itself, and information on the light source(s).

Accommodation is a mechanism of depth perception, in which the human brain uses a degree of background blurring, which occurs when the eye optical system is focused on an object observed against that background, to evaluate the distance to the object. The closer the object of the viewer's attention is positioned, the greater curvature of the eye crystalline lens and background blurring happens. Acquiring information by accommodation is generally possible when the distance between the viewer and the object is small or very small.

Convergence is a tendency of the eyes to bring their pupils together when looking at objects located near the viewer. On the other hand, remote objects are observed in such a way that the eyesight lines tend to be parallel.

Binocular disparity is some difference between images formed in two eyes. This effect is also called binocular parallax or stereoscopy. It is binocular disparity of retinal images that mainly contributes to a strong impression of 3D volume of an image.

In the process of visual perception of the environment, a person simultaneously uses all the mechanisms of volume perception available among the above mentioned ones; the brain reduces data of all mechanisms into a single general picture. The interaction of these mechanisms is based on two main strategies: the additivity strategy that involves integration of information obtained through different mechanisms, and the selectivity strategy based on primary use of information provided by one leading mechanism of depth perception. The additivity strategy is used more often and has greater efficiency in the perception of space and, in particular, the depth of the image. As the dominant feature in the selectivity strategy, occlusion, motion parallax, or binocular disparity are used most often.

When virtual reality systems are constructed, one should utilize as many 3D spatial perception mechanisms as possible to ensure that effects provided by these mechanisms enhance each other, in order to provide realistic three-dimensional image. While selecting the mechanisms, preference should be given to psychological mechanisms, as each of them may be dominant in the selective strategy, and all of them are very influential in the additive strategy. Correct selection of the spatial perception mechanisms for use in a virtual reality system facilitates the human brain to consider information provided by unused mechanisms as being less reliable and to screen it out. In any case, both binocular disparity and motion parallax should be simultaneously used for ensuring realism of a three-dimensional image in a virtual reality system (hereinafter such a system is referred to as MP3D, or Motion Parallax 3D).

It is necessary to modify an image on the screen according to a change of the viewer's position so as to obtain the motion parallax effect, i.e., each frame of a 3D scene should be projected on the display screen surface exactly as it is seen from the current point of view of the viewer. Motion parallax effect should be provided considering binocular disparity, i.e., the modification of image on the screen according to change of the viewer's position should be provided for each of the viewer's eyes. In order to decrease the geometric distortion of the image down to the perceptibility threshold and to ensure the viewer's ophthalmic comfort, the time interval between the start instant of determination of the viewer's position and the instant of output of the image on the screen should not exceed 5 ms.

A system for displaying three-dimensional objects is known from US Patent Application Publication No. US2012200676, the system providing effects of binocular parallax (stereo cue) and motion parallax (parallax cue) in both horizontal and vertical planes. The motion parallax effect is implemented by user head position tracking by means of triangulation using magnetic sensors or infrared sensors or through user eyes position tracking by means of an optical system (Kinect). The binocular parallax effect is implemented using a two-dimensional display and shutter glasses or using an autostereoscopic display. The application also mentions a multi-user operation mode of the system.

A system for displaying three-dimensional objects is known from US Patent Application Publication No. US2013147931, the system providing effects of binocular parallax and motion parallax. The motion parallax effect is implemented by using user face position optical tracking, and the binocular parallax effect is implemented by using an autostereoscopic display, wherein the autostereoscopic display parameters are to be changed in a stepwise (discrete) manner, depending on the range and speed of movement. The application also mentions markers based on light-emitting diodes (LED). The application does not mention a multi-user operation mode of the system.

A system for displaying three-dimensional objects is known from U.S. Pat. No. 7,705,876, the system providing effects of binocular parallax and motion parallax. The motion parallax effect is implemented by optical tracking eyes pupil position of the user using reflection of infrared (IR) illumination from retina, and the binocular parallax effect is implemented by using an autostereoscopic display. The patent does not mention a multi-user operation mode of the system.

A system for displaying three-dimensional objects is known from Patent Publication No. WO2005009052, the system providing effects of binocular parallax and motion parallax. The motion parallax effect is implemented by user head position optical tracking, and the binocular parallax effect is implemented by using an autostereoscopic display. The application does not mention a multi-user operation mode of the system.

A system for displaying three-dimensional objects is known from U.S. Pat. No. 8,581,966, the system providing effects of binocular parallax and motion parallax. The motion parallax effect is implemented by user head position optical tracking, and the binocular parallax effect is implemented by using an autostereoscopic display in a stepwise (discrete) manner. There is no indication of a multi-user operation mode of the system in the patent.

A system for displaying three-dimensional objects is known from U.S. Pat. No. 8,199,186, the system providing effects of binocular parallax and motion parallax. The motion parallax effect is implemented by user head position optical tracking using position prediction based on parameters like motion speed, acceleration, etc., and the binocular parallax effect is implemented by using an autostereoscopic display. Calibration of the system is disclosed. The patent does not mention a multi-user operation mode of the system. The patent mentions a possibility of the user head position prediction, but no technical solution is disclosed, that would allow assuming that such prediction is able to provide a realistic three-dimensional image corresponding to overall delay within 5 ms in a system with no delay compensation, i.e., that such prediction is able to provide the overall delay within 5 ms and that prediction errors do not incur appreciable degradation of realism of the three-dimensional image.

A system for displaying three-dimensional objects is known from U.S. Pat. No. 7,692,640, the system providing effects of binocular parallax and motion parallax. The motion parallax effect is implemented by user head position tracking using magnetic, ultrasound or infrared sensors and markers or using video cameras, and the binocular parallax effect is implemented by using polarized glasses or an autostereoscopic display. The patent does not mention a multi-user operation mode of the system.

A system for displaying three-dimensional objects is known from US Patent Application Publication No. US2012172119, the system providing effects of binocular parallax and motion parallax. The motion parallax effect is implemented by user head position optical tracking, and the binocular parallax effect is implemented by using an autostereoscopic display. The patent does not mention a multi-user operation mode of the system.

A system for displaying three-dimensional objects is known from US Patent Application Publication No. US2012019908, the system providing effects of binocular parallax and motion parallax. The motion parallax effect is implemented by user head position tracking, and the binocular parallax effect is implemented by using an autostereoscopic display having time separation of the disparate images. The application does not mention a multi-user operation mode of the system.

A system for displaying three-dimensional objects is known from U.S. Pat. No. 5,872,590, the system providing effects of binocular parallax and motion parallax. The motion parallax effect is implemented by user eyes position tracking using two photo cameras or using magnetic or ultrasound sensors, and the binocular parallax effect is implemented by using an autostereoscopic display. The patent mentions a multi-user operation mode of the system, however, it is indicated that the stereoscopic effect is provided in a particular area, so the image is an ordinary two-dimensional image outside this area.

A system for displaying three-dimensional objects is known from U.S. Pat. No. 8,537,206, the system providing effects of binocular parallax and motion parallax. The motion parallax effect is implemented by user head position optical tracking using optical recognition of the user's face or using light emitting markers, and the binocular parallax effect is implemented by using spatial separation (autostereoscopy), time separation (shutter glasses) or polarization separation (polarized glasses), including a multi-user operation mode of the system.

A system for displaying three-dimensional objects is known from U.S. Pat. No. 8,203,599, the system providing effects of binocular parallax and motion parallax. The motion parallax effect is implemented by user's pupil position optical tracking using reflection of IR illumination from retina, and the binocular parallax effect is implemented by using an autostereoscopic display, wherein the display is able to automatically adjust the image based on measured user blink rate. The patent does not mention a multi-user operation mode of the system.

A system for displaying three-dimensional objects is known from US Patent Application Publication No. US2012038635, the system providing effects of binocular parallax and motion parallax. The motion parallax effect is implemented by user head position optical tracking using markers, and the binocular parallax effect is implemented by using shutter glasses or an autostereoscopic display. The patent mentions a multi-user operation mode of the system, however it is also indicated that the image is displayed for a group of users located close to each other.

A system for displaying three-dimensional objects is known from US Patent Application Publication No. US2012044330, the system providing effects of binocular parallax and motion parallax. The motion parallax effect is implemented by user head position optical tracking using optical recognition, and the binocular parallax effect is implemented by using an autostereoscopic display. The patent mentions a multi-user operation mode of the system, however a real implementation of this mode by means of an autostereoscopic display is quite doubtful.

A system for displaying three-dimensional objects is known from US Patent Application Publication No. US2012062556, the system providing effects of binocular parallax and motion parallax. The motion parallax effect is implemented by user position tracking using optical recognition or using an accelerometer or a rangefinder, and the binocular parallax effect is implemented by using an autostereoscopic display. The application does not mention a multi-user operation mode of the system.

A system for displaying three-dimensional objects is known from US Patent Application Publication No. US2006139447, the system providing effects of binocular parallax and motion parallax. The motion parallax effect is implemented by user's pupil position optical tracking using reflection of IR illumination from retina, and the binocular parallax effect is implemented by using an autostereoscopic display. The patent does not mention a multi-user operation mode of the system.

It should be noted that indication of using or possibility of using an autostereoscopic display in the above prior art documents makes quite doubtful the very possibility of a full-scale implementation of the motion parallax effect, as it is well-known in the art that autostereoscopic displays are able to provide information output only for a limited number of viewpoints, and this number is currently limited by optical parameters of the autostereoscopic displays, computation capacity of computers, and bandwidth of the video signal transmission channels. The drawback of the known autostereoscopic systems is that the motion parallax effect is totally absent when the user is statically located in one operation area of the autostereoscopic display, and the binocular parallax effect is destroyed, while the user moves and the operation area is changed. Using autostereoscopic displays in multi-user systems is also very doubtful given the current level of development of this technology, as it is impossible to ensure using the same operation area by different users simultaneously and maintain the motion parallax effect for all the users.

Theoretically, the motion parallax effect may be implemented while using an autostereoscopic display, if the number of operation areas tends to infinity. However in a real implementation of such a system, finite dimensions of optical elements (subpixels of the display, lenses, prisms, arrays, etc.) and bandwidth of the display data transmission channels incur some limitations of the display resolution and the number of operation areas thereof, since in such a system, it is necessary to transmit a considerable amount of excess information even for a single user, wherein the information is required for displaying an image visible from all those places where the user may find oneself during movement.

Additionally, none of the above documents discloses technical solutions that would provide the overall delay within 5 ms or would allow bypassing this condition and still ensure a high degree of realism of the virtual objects.

Moreover, none of the above documents discloses technical solutions that would provide a full-scale implementation of the multi-user operation mode, where position of each user is tracked near the display and a three-dimensional image having acceptable quality is displayed for each of the users.

It is clear from the above examples of the prior art, that the problem of realistic displaying three-dimensional objects using two-dimensional visualization means is currently far from a solution. It is also clear that formation of a three-dimensional scene and representation of the corresponding image on a display physically takes about 25 ms, so this problem cannot be solved by optimization of the existing software algorithms and improvement of the existing hardware of MP3D systems.

This conclusion is evidenced by features of commercially available MP3D systems like EON Ibench, Idesk, Icube (EON Reality, Inc., www.eonreality.com) and zSpace (zSpace, Inc., www.zspace.com). According to an estimate made by the inventor, geometric distortions of three-dimensional object images in these systems provoke distinct visual discomfort to a viewer. When the viewer moves at a speed of about 1 m/s. This fact limits the field of application of such systems to domains where the user is relatively static and/or is located at a substantial distance from the surface displaying the image, in particular, to desktop or "surrounding" systems for educational, scientific or engineering purpose, but it makes them poorly applicable for interactive virtual reality game systems, where the players are highly mobile. It should also be noted that visual discomfort manifests itself in various ways in systems having different configurations, and it depends, inter alia, on availability of real objects in the user's field of view, which objects serve as reference points for visual perception mechanisms. When such objects are available, the user is more likely to notice geometric distortions of virtual objects relative to the real objects. In particular, the discomfort is more perceptible in systems having just one image displaying surface, than in full-immersive systems.

Thus, an object of this invention is providing realistic representation of three-dimensional objects for one or more viewers by using visualization means forming an image on a screen surface and utilizing at least two main psychological visual mechanisms of spatial perception of images, binocular parallax and motion parallax, so as to provide a degree of realism not less than degree of realism in a hypothetical MP3D system having an overall delay within 5 ms, providing a high degree of geometric correctness of the view, when the viewer moves at a speed in a range of 0 m/s to 3 m/s and an acceleration in a range of 0 m/s$^2$ to 10 m/s$^2$, and using manipulators for control of virtual objects, wherein orientation and spatial position of the manipulators are tracked substantially in the same way as position of the viewer's eyes.

SUMMARY OF THE INVENTION

An object of this invention is achieved by a method of creating a 3D effect of an image formed on a display device surface, the method simultaneously providing at least effects of binocular parallax and motion parallax and including the step of using a system comprising at least one display device; at least one pair of glasses for stereoscopic separation of images, the glasses comprising at least two optical shutters and at least two markers; at least two optical sensor arrays; at least two reading and processing devices; a marker 3D coordinates calculation device; at least one marker coordinates prediction device; a 3D scene formation device; at least one image output device. The method further includes obtaining pictures from the optical sensor arrays, detecting the markers in these pictures, and determining 2D coordinates of the markers; determining 3D coordinates of the markers based on 2D coordinates of the markers; extrapolating coordinates of the markers so as effective overall delay does not exceed 5 ms; performing formation of a 3D scene considering the 3D coordinates of the markers; and outputting the 3D scene image on the at least one display device, wherein images of the 3D scene intended for each eye of a viewer are outputted alternately.

In such a method, the markers may be light emitting markers.

Such a method may further include a step of controlling a tracing window, wherein the system may further comprise at least one tracing window control device.

Such a method may further include a step of calibrating means for tracking viewer position, wherein these means comprise the markers, the optical sensor arrays, the reading and processing devices and the marker 3D coordinates calculation device.

Such a method may further include a step of detecting interfering emission sources and excluding effect thereof on detection of the markers.

Such a method may further include a step of synchronizing the optical sensor arrays with each other or with each other and with the markers, prior to the step of obtaining pictures from the optical sensor arrays.

Such a method may further include a step of selective switching the markers on and off, wherein the system may further comprise at least one radio communication device, and the glasses of the system may also comprise at least one radio communication device.

Such a method may further include a step of generating a luminosity map when the markers are switched off, in order to automatically detect interfering emission sources and exclude effect thereof on detection of the markers, prior to the step of detecting the markers.

Such a method may further include a step of identifying the markers after the step of determining 2D coordinates of the markers, wherein the system may further comprise a marker identification device.

Such a method may further include a step of extrapolating 2D coordinates of the markers prior to the step of determining 3D coordinates of the markers.

Such a method may further include a step of extrapolating 3D coordinates of the markers after the step of determining 3D coordinates of the markers.

In such a method, the system being used may comprise at least three optical sensor arrays, at least three reading and processing devices and at least three tracing window control devices.

In such a method, displaying the image for each eye of the viewer may be performed for more than one viewer.

In such a method, processing of the data obtained from the optical sensor array may start before reading a frame is finished.

In such a method, processing of the data obtained from the optical sensor array may be performed in the reading and processing devices in a distributed manner.

In such a method, determining 2D coordinates of the markers may be performed with subpixel accuracy.

In such a method, the system being used may further comprise at least one radio communication device, and the glasses may also comprise at least one radio communication device and an orientation device, and data obtained from the orientation device of the glasses via the radio communication device may be used for determining 3D coordinates of the markers disposed on the glasses, when determination of the markers by the optical sensor arrays is temporarily impossible.

In such a method, the system being used may further comprise at least one radio communication device and at least one manipulator comprising at least one radio communication device and an orientation device, and data obtained from the orientation device of the manipulator via the radio communication device may be used for determining 3D coordinates of the markers disposed on the manipulator, when determination of the markers by the optical sensor arrays is temporarily impossible.

In such a method, the system being used may further comprise at least one radio communication device, and the glasses of the system may also comprise at least one radio communication device and an orientation device, and data obtained from the orientation device of the glasses via the radio communication device may be used for determining size and position of the tracing window.

In such a method, the system being used may further comprise at least one radio communication device, and at least one manipulator comprising at least one radio communication device and an orientation device, and data obtained from the orientation device of the manipulator via the radio communication device may be used for determining size and position of the tracing window.

The step of detecting the markers and determining 2D coordinates of the markers may include the steps of selecting lines of the optical sensor array for reading a selected line of the optical sensor array, if a signal intensity of each pixel in the selected line exceeds a threshold value; if the pixel signal intensity exceeds the threshold value, detecting the marker picture outline and then passing to a step of calculating size of the marker picture outline; if the pixel signal intensity does not exceed the threshold value, returning to the step of reading a selected line of the optical sensor array; calculating size of the marker picture outline; checking size of the marker picture outline; if the size of the marker picture outline is within predetermined limits, passing to a step of calculating geometric center of the marker picture outline; if the size of the marker picture outline is not within predetermined limits, passing to a step of excluding the marker picture outline; calculating geometric center of the marker picture outline; maximal and minimal radii of the marker picture outline; ratio of the maximal and minimal radii of the marker picture outline; if the ratio of the maximal and minimal radii of the marker picture outline is within predetermined limits, passing to a step of checking brightness uniformity, if the ratio of the maximal and minimal radii of the marker picture outline is not within predetermined limits, passing to a step of excluding the marker picture outline; checking brightness uniformity of the area within the marker picture outline; the brightness uniformity of the area within the marker picture outline is within predetermined limits, passing to a step of calculating coordinates of weighted center of the marker picture outline, if the brightness uniformity of the area within the marker picture outline is not within predetermined limits, passing to a step of excluding the marker picture outline; excluding the marker picture outline from further consideration and passing to a step of labelling the marker picture outline; calculating coordinates of weighted center of the marker picture outline, transferring for a corresponding step at least one of the following: the coordinates of the weighted center of the marker picture outline, the marker picture outline size, and the ratio of the maximal and minimal radii of the marker picture outline, and then passing to a step of labelling the marker picture outline; and labelling the marker picture outline and excluding the marker picture outline from further analysis of the picture obtained from the optical sensor array.

In such method, the step of controlling the tracing window may include the steps of checking if all markers are present in a picture obtained from the optical sensor array; if all markers are present in the picture obtained from the optical sensor array, passing to a step of checking necessity of adjustment of the tracing window parameters; if not all markers are present in the picture obtained from the optical sensor array, determining an area, where the marker missing in the frame may be located, then determining size and position of the tracing window, and transferring the size and the position of the tracing window for a corresponding step; checking if adjustment of the tracing window is necessary; if adjustment of the tracing window is necessary, determining size and position of the tracing window, and transferring the size and the position of the tracing window for a corresponding step.

An object of this invention is also achieved by a system for creating a voluminosity effect of an image formed on a display device surface, the system simultaneously providing at least effects of binocular parallax and motion parallax and including at least one display device configured to display a sequence of images; at least one pair of glasses configured to provide stereoscopic separation of images, the glasses comprising at least two optical shutters and at least two markers disposed in a predetermined way; at least two optical sensor arrays configured to obtain pictures of the markers and disposed in a predetermined way; at least two reading and processing devices configured to read data from the optical sensor array and to determine 2D coordinates of the markers; a marker 3D coordinates calculation device configured to calculate 3D coordinates of the markers based on 2D coordinates of the markers; at least one marker coordinates prediction device configured to extrapolate coordinates of the markers so that effective overall delay does not exceed 5 ms; a 3D scene formation device configured to form a 3D scene considering the 3D coordinates of the markers; and at least one image output device configured to output the 3D scene image to the at least one display device.

In such system, the markers may be light emitting markers.

Such a system may further comprise at least one tracing window control device configured to determine an area of the optical sensor array for reading data therefrom, depending on position of a picture of at least one of the markers, wherein size of the area of the optical sensor array is less than size of the entire frame of the optical sensor array.

Such a system may be further configured to calibrate viewer tracking means comprising the markers, the optical sensor arrays, the reading and processing devices and the marker 3D coordinates calculation device.

Such a system may be further configured to automatically detect interfering emission sources and to exclude effect thereof on detection of the markers.

Such a system may further comprise a synchronization device configured to provide synchronization of the optical sensor arrays with each other or with each other and with the markers.

Such a system may further comprise at least one communication device, wherein the glasses may also comprise at least one communication device, and the system may be configured to selectively switch the markers on and off.

Such a system may further comprise a marker identification device configured to determine if a marker belongs to a certain device, based on data obtained from the optical sensor arrays.

In such a system, the marker coordinates prediction device may be configured to extrapolate 2D coordinates of the markers; it may also be configured to extrapolate 3D coordinates of the markers.

Such a system may further comprise at least three optical sensor arrays, at least three reading and processing devices and at least three tracing window control devices.

Such a system may be further configured to display three-dimensional objects for more than one viewer.

Such a system may be further configured to start processing data obtained from the optical sensor array before reading a frame is finished.

Such a system may be further configured to process data obtained from the optical sensor array in the reading and processing devices in a distributed manner.

In such a system, the reading and processing device may be configured to determine 2D coordinates of the markers with subpixel accuracy.

In such a system, the glasses may comprise at least one radio communication device.

In such a system, the glasses may comprise at least one orientation device comprising at least one of the following devices: an accelerometer, a magnetometer, a gyroscope.

Such a system may further comprise at least one radio communication device and may be configured to use data obtained from the orientation device of the glasses via the radio communication device for determination of 3D coordinates of the markers, when determination of the markers by the optical sensor arrays is impossible.

Such a system may further comprise at least one tracing window control device configured to determine an area of the optical sensor array for reading data therefrom, wherein size of the area of the optical sensor array may be less than size of the entire frame of the optical sensor array, and the system may be configured to use data obtained from the orientation device of the glasses via the radio communication device for determination of size and position of the tracing window.

Such a system may further comprise at least one manipulator. The manipulator may comprise at least one marker. The manipulator may comprise at least one orientation device comprising at least one of the following devices: an accelerometer, a magnetometer, a gyroscope.

Such a system may further comprise at least one radio communication device and may be configured to use data obtained from the orientation device of the manipulator via the radio communication device for determination of 3D coordinates of the markers, when determination of the markers by the optical sensor arrays is impossible.

Such a system may further comprise at least one radio communication device and at least one tracing window control device configured to determine an area of the optical sensor array for reading data therefrom, and it may be configured to use data obtained from the orientation device of the manipulator via the radio communication device for determination of size and position of the tracing window.

Such a system may further comprise at least one radio communication device, wherein the manipulator may also comprise at least one radio communication device, and the system may be configured to selectively switch the markers on and off.

Such a system may be further configured to generate a luminosity map when the markers are switched off, in order to automatically detect interfering emission sources and exclude effect thereof on detection of the markers.

In such a system, the markers may be configured to emit IR light.

In such a system, the markers and/or the optical sensor arrays may be equipped with narrow-band optical filters.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1A:
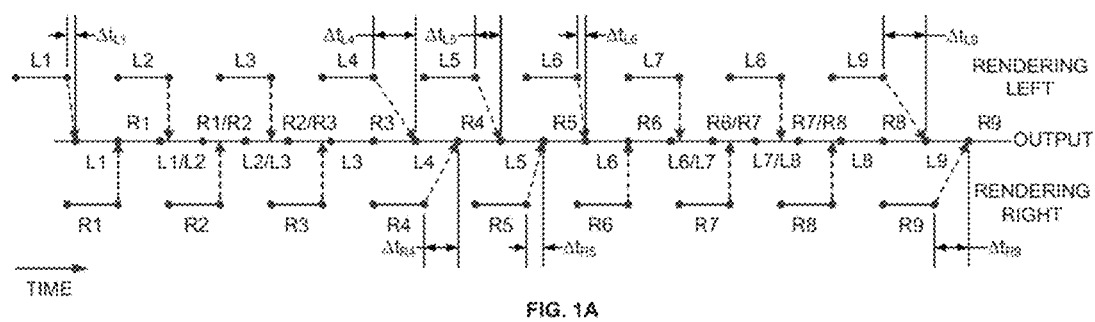
FIG. 1A and FIG. 1B show a conventional rendering method in which the frame rendering time exceeds the time of displaying the frame on the screen.

Reference will now be made in detail to the embodiments of the present invention, examples of which are illustrated in the accompanying drawings.

The basic criteria of quality of MP3D systems relate to realism of perception of a virtual world, which depends on quality of stereoscopic separation, quality of rendering and geometric correctness of the view.

Quality of stereoscopic separation is degraded due to ghosting, a phenomenon when each eye perceives the image intended for the other eye, besides the image intended for this eye. Ghosting may be caused by various factors, like residual phosphorous glow in plasma screens or incomplete coincidence of polarization direction, when polarization stereoscopic separation is used. At this time, a combination of a DLP (Digital Light Processing) projector and shutter glasses provides the best quality of stereoscopic separation.

Generally, quality of rendering is not a critical factor in modern MP3D systems, however, more detailed rendering and using special effects additionally allow enabling psychological mechanisms of spatial perception like texture gradient, shading, etc., which facilitates increasing the realism of perception.

Geometric correctness of a 3D scene projection is a very important quality indicator of an MP3D system. If an image is formed for viewing from a first position, but is displayed to a viewer located in a second position, then the viewer sees a distorted object, i.e., the viewer receives the wrong information on the object shape and proportions. These distortions become noticeable when the position error (the distance between the first position and the second position) is about 5% of the distance between the viewer and the screen (i.e., less than 5 mm for the most of virtual reality systems).

Geometric correctness of a view is affected by precision of tracking position of the viewer and by the time period between the start instant of determination of the viewer position and the instant of output of the image on the screen. The precision of tracking directly affects the geometric correctness of a virtual object and it is defined by (a) overall geometric error depending on architecture and geometry of the tracking means, and (b) error caused by noise. The time period between the start instant of determination of the viewer position and the instant of output of the image on the screen (hereinafter referred to as an overall delay) is the main cause of geometric incorrectness of a 3D scene projection in MP3D systems. During the overall delay, a moving viewer may travel some distance, which distance represents the positioning error. As will be shown further, this delay exceeds 60 ms in conventional MP3D systems. Given that the viewer movement speed may be about 2 m/s, the positioning error turns to be quite substantial (more than 100 mm) in such systems.

The overall delay is due to delays during execution of the following steps of the system operation.

A. Determination of the Viewer Position

The viewer position may be determined by various methods, the most widely used one is positioning using optical systems. Additionally, there are positioning systems using ultrasound, magnetic and radiofrequency sensors, but these systems are not commonly used due to their insufficient positioning accuracy.

Markers mounted on the tracked object (e.g., on the user's glasses) are used most often for optical positioning. The use of markers allows not only easy identifying the tracked object on an image, but also provides a high precision of determination of coordinates. Besides MP3D systems, optical positioning is used in motion capture technologies employed in cinematography and game development, in order to record mimics or gestures.

Contrary to the systems employed in 3D cinematography, MP3D systems are much more demanding for precision and purity of data (it should be noise-free data), as the marker position data is used immediately after reception thereof, so it cannot be adjusted by further processing.

Besides systems of optical positioning using markers, there are systems with no markers, wherein position of user eyes is determined by processing face images obtained from a video camera. Theoretically, this approach allows for a great expansion of using MP3D systems, however in practice, modern face tracking systems do not provide the required positioning accuracy, and more importantly, they are extremely resource-demanding, which causes an overall delay (about 80 ms to 120 ms) which is intolerably long for virtual reality systems. This hampers using such optical positioning systems in MP3D systems.

A hypothetical marker-based positioning system based on Firefly MV camera produced by Point Grey (http://ptgrey.com/) equipped with optical sensor Micron MT9V022 have the following values of the delay components:

getting a frame (exposure time) takes 16.6 ms;
reading data from the sensor and sending a frame through a USB port into a computer takes about 20 ms;
recording the frame into memory and processing the data in the computer takes 10 ms to 20 ms depending on the computational power of the computer and algorithms used for recognizing the tracked object.

Therefore, the overall delay in determination of the viewer position in this system is about 36.6 ms to 46.6 ms.

B. Generation of a Three-Dimensional Scene

In MP3D systems, an image is calculated in real time and it cannot be entirely prepared in advance. Technologies of generation of images are similar to technologies used in game development. However, when three-dimensional scenes are generated in MP3D systems, a non-orthogonal axes projection matrix is used, so many algorithms for generation of three-dimensional scenes are either incompatible with this type of matrices, or require substantial improvement. This is valid for rendering effects in the screen space, like SSAO (Screen Space Ambient Occlusion).

Duration of the rendering process is defined by capacity of a 3D scene (i.e., it depends on a number of geometric elements, complexity of lighting, existence and appearance of additional optical effects) and performance of the GPU (Graphics Processing Unit). The problem of how to limit the rendering duration to one frame output time is solved by increasing the GPU performance, as well as by optimization of the 3D scene. In the context of estimation of the overall delay in an MP3D system having the frame refresh rate of 120 Hz, the average rendering duration may be assumed to be 8.3 ms.

Also, some additional waiting time of 0 ms to 8.3 ms between the instant of total readiness of a frame and the instant of start of the frame output to a display device is typical for systems using time separation of stereoscopic channels. The maximum delay of 8.3 ms occurs, e.g., when rendering of the left eye frame is finished at the moment when output of the right eye frame starts, so the waiting time before the left eye frame output is equal to the output time of the right eye frame.

Therefore, the formation time of a three-dimensional scene may be estimated to be in average $$8.3+(8.3/2)=12.4 \text{ (ms)}.$$

C. Representation of an Image on Display

Choosing a displaying device (a display or a projector) directly affects the overall delay of the system, as the most of modern displays (in contract to legacy CRT displays) perform buffering and additional processing of the image in order to improve its quality, and this causes an output delay, which sometimes may be quite long. This parameter may be identified as an internal delay of the displaying device. Theoretically, minimum value of the internal delay depends on type of the displaying device and is usually 8.3 ms; however, devices having this minimal internal delay are quite rare in real life. As for plasma panels, the inventor is unaware of such devices having internal delays less than 30 ms. Among 3D LCD displays or DLP projectors, some devices having a minimal internal delay of slightly more than 8.3 ms may be found.

The output time for one image frame in stereoscopic MP3D systems is 8.3 ms at 120 Hz; meanwhile the image is represented on the screen in different ways depending on the technology implemented in the displaying device. In particular, the image may be represented line-by-line during the total time of output of the frame, as done in LCD displays; alternatively, the image may be represented channel-by-channel, as done in DLP projectors; otherwise, the image may be represented for the entire frame at the very beginning of the output time period and further gradually go out, as done in plasma panels.

The time between the start of output of a frame and the moment when half of total number of photons to be received by retina during the whole time of displaying the frame is actually received by retina, may be defined as an image output time parameter. Hereinafter, the moment of image output onto the screen corresponds to exactly this moment, if not otherwise clearly indicated. In case of LCD displays or DLP projectors, this parameter is equal to half of the frame duration, i.e., 4.15 ms. For plasma panels, this parameter is somewhat smaller, about one third of the frame duration.

Therefore, the minimum image output time corresponds in practice to $$8.3+(8.3/2)=12.4 \text{ (ms)}$$

in displays having small internal delays (LCD displays and DLP projectors), and $$30+(8.3/3)=32.8 \text{ (ms)}$$

in displays having large internal delays (plasma panels).

Thus, typically for modern MP3D systems, the overall delay between the start instant of determination of the viewer position and the instant of output of the image on the screen ranges approximately from 61.4 ms to 71.4 ms in displays having small internal delay, and approximately from 81.8 ms to 91.8 ms in displays having large internal delay, and this causes considerable geometric distortions of the image. These distortions negatively affect the impression of authenticity of a virtual reality and result in tangible visual discomfort to the viewer.

It should be noted that a user of an MP3D system perceives the overall delay not as delay of change in the image during movement, but as geometric distortions of the scene objects, in particular, vertical elements of objects look deviated from the vertical (i.e., inclined), whereas horizontal elements look as if they have wrong proportions.

Consequently, a viewer may feel a dissonance between data acquired by visual perception channels and data obtained from vestibular system. This dissonance causes onset of naupathia symptoms (nausea, vertigo, cephalalgia). This phenomenon is called virtual reality motion sickness or VR-sickness.

Moreover, the impact of the overall delay on image geometric distortions observed by a viewer differs for cases of uniform motion of the viewer and accelerated motion of the viewer. In particular, it has been found experimentally by the inventor, that human perceptive system accepts image geometric distortions rather indifferently, when the viewer moves uniformly, especially in uniform rectilinear motion. In this case distortions exist, but their nature does not change. For instance, a cubical object is perceived by a viewer as a parallelepiped, but the parameters of the parallelepiped will be unchanged so long as the viewer moves uniformly, and a vertically oriented object looks inclined, but stable. During accelerated motion, especially when direction of movement is changed sharply, distortions become highly noticeable and very unpleasant to the viewer, like oscillation of vertically oriented objects from side to side, which provokes naupathia. This additionally indicates the importance of minimization of the overall delay in game MP3D systems, which are characterized by a high motion activity of viewers.

According to the inventor's estimate, the overall delay should not exceed 5 ms so as to reduce image geometric distortions down to perceptibility threshold and ensure visual comfort to the viewer. Implementation of an MP3D system for several viewers (multi-user mode) imposes even tighter constraints on the system. It is obvious that achievement of such a value of the overall delay is impossible by trivial optimization of software algorithms and hardware improvement of existing MP3D systems.

The above-indicated value of the overall delay is valid both for systems with no prediction of the viewer position and for systems with prediction of the viewer position, i.e., for systems using time extrapolation of the viewer's coordinates. In the latter, the effective overall delay is the period of time between the start instant of determination of the viewer position and the instant of output of the image on the screen with due account for the delay compensation. The main quality criterion of such a virtual reality system is reliability of prediction of the viewer position, which reliability largely depends on the overall delay value prior to compensation.

An object of this invention is achieved owing to implementation of an LCMP3D (Lag Compensated MP3D) system. One of key technical solutions of the LCMP3D system is prediction of the viewer position for the moment of prospective output of image on the screen. This allows compensating the physically existing overall delay to assure realism of representation of three-dimensional objects in the LCMP3D system not worse than realism of a hypothetic MP3D system without compensation, wherein the overall delay does not exceed 5 ms. It should be noted that the fact of using overall delay compensation in an MP3D system does not guarantee realism of representation of three-dimensional objects, since prediction of the viewer position is stochastic in its nature and thus constitutes an additional distorter. For example, compensation of the overall delay amounting to 80-120 ms, which is typical for tracking systems based on optical recognition of the viewer's face, is unable to provide realism of representation of three-dimensional objects due to low accuracy of extrapolation of the viewer coordinates for such a long-time interval.

A set of original solutions regarding design, technology and algorithm was developed to provide key parameters of the LCMP3D system, which solutions facilitate predicting viewer position and compensating the overall delay. Combination of these solutions allows assuring a high degree of realism of spatial image perception in a virtual reality system.

Realism of representation of three-dimensional objects in a system with prediction of the viewer position directly depends on accuracy of the prediction. It is also known that outcome of extrapolation algorithms is very sensitive to quantity and quality of input data. In particular, the following factors affect the prediction accuracy:

(a) age of data; the prediction accuracy falls dramatically in a nonlinear manner, when the data age increases;

(b) size of the sample, based on which the extrapolation is performed; the prediction accuracy rises, as the sample size increases, however if the sampling rate is static, increase in the sample size over some critical value causes decrease in the prediction accuracy due to obsolescence of data in the heading part of the sample;

(c) noisiness of data; the prediction accuracy drops, when the level of noise increases;

(d) horizon of extrapolation; the prediction accuracy falls dramatically in a nonlinear manner, when the extrapolation horizon widens.

The inventor has found experimentally that in an LCMP3D system, the extrapolation horizon should not exceed 30 ms to provide good reliability of the viewer position extrapolation and it should not exceed 50 ms in order to provide satisfactory reliability of the extrapolation.

Since the extrapolation horizon is conditional on the overall physical delay, high accuracy of extrapolation may be assured by the other three parameters, namely, a smallest possible input data age, optimal sample size, and decreased noisiness of input data.

The following set of technical solutions was carried out to assure quantity and quality of input data necessary for extrapolation:

use of active controlled markers;
use of "smart cameras" as tracking cameras;
use of "tracing window";
increase of the number of tracking cameras;
use of ALAP rendering;
calibration of tracking means.

Active Markers

Passive markers are used in the most of MP3D systems. Usually, a passive marker is an area of the surface of glasses or manipulators, covered with a retro-reflecting material. Sometimes a passive marker may be provided in a form of a small ball (about 10 mm in diameter). When such a marker is illuminated by a light source located close to tracking camera lens, the marker is visible as a bright spot in a picture. A disadvantage of this method is the need for illumination, which causes appearance of flares in the picture. The LCMP3D system uses active markers, which themselves are light sources operating in the infrared range (wavelength of about 850 nm). Active markers allow getting rid of flares and provide a far greater brightness than passive markers, which facilitates considerable decreasing exposure time of a tracking camera while maintaining a high contrast of the frame picture. The decrease in exposure time, in turn, allows decreasing a marker "smearing" effect in the picture, when the markers move fast and this is particularly important for game embodiments of the LCMP3D system.

The exposure time in the LCMP3D system is about 100 µs, and an active marker is visible as a bright white spot against black background. This fact made it possible to employ a special processing algorithm in the LCMP3D system, which allows attaining a subpixel accuracy of positioning the marker in the frame owing to analysis of pixel brightness in the marker picture border. This algorithm enables almost total elimination of influence of optical noise on quality of output data, as well as achieving marker positioning accuracy of about ⅓₀ of a pixel, which, in turn, provides an increase in performance of the tracking means owing to decrease of the frame size, and provides possibility of using less expensive image sensor arrays in the tracking cameras. The tracking camera frame size is 0.36 megapixels (the sensor has 752×480 pixels) in the LCMP3D system. Small frame size assures a high speed of reading the frame in the LCMP3D system, which allows decreasing the input data age for the extrapolation algorithm and considerably increase the "density" of these input data. Therefore, using active markers enables increasing the viewer position prediction accuracy.

Controlled Markers

Markers controlled via a radio channel are used in the LCMP3D system. Using a radio communication device allows remotely switching on and off each individual marker or a group of markers; it facilitates identifying markers, which is especially important for initializing the system or when a tracking failure occurs. However, absence of a marker light emittance leads to absence of the marker picture in the corresponding frame of the tracking camera. Therefore, the identification procedure should be performed as rarely as possible in those moments when the data of the marker position may be recovered (e.g., when the viewer moves uniformly straight). Additionally, a possibility of control of active markers helps substantially saving the battery charge in glasses or manipulators, so their continuous operating time may be increased, as the active markers may be switched on, simultaneously with action of electronic shutters of the tracking cameras. Synchronization of markers and tracking cameras provides an increase of pulse power of the marker illumination without exceeding allowable mean power of the marker light source. Consequently, it provides a very short exposure time of the tracking cameras while maintaining a high contrast of the frame picture, thus promoting increase in performance of the tracking means.

Smart Cameras

Transferring pictures from the tracking cameras to a computer takes a substantial time, so it was decided to process pictures directly in the cameras. In a test sample of the LCMP3D system, cameras LeanXcam (Supercomputing Systems AG, Zurich, Switzerland) equipped with embedded processor Blackfin ADSP-BF537 under control of operating system µCLinux were used. This solution allowed moving processing the frame pictures from the computer CPU directly into the cameras and distributing the computational load between several cameras, so the mean performance of the tracking means reached about 350 frames per second. The next step was development of new tracking cameras optimized for LCMP3D systems. Maximum performance of the new cameras is more than 900 frames per second, and these cameras are far more robust to physical environment (temperature fluctuations, vibration, shocks). Moreover, the used technical solutions allow (when needed) to start processing the pictures before the whole frame is read, which provides additional possibilities for increasing the tracking means performance.

Tracing Window

In high-performance tracking systems, position of a marker in frame N and frame N+1 differs slightly. This allows defining in advance a tracing window, i.e., an area of a frame, which should be read from the tracking camera's optical sensor array in the next frame instead of reading the entire frame. As a result, the time of reading data from the optical sensor array and the time of its subsequent processing may be reduced substantially. In the LCMP3D system, control of the tracing window size and position in the frame is performed by a combination of centralized and decentralized control approaches, for example, a computer provides "strategic" control by defining which markers each camera should trace, and smart cameras independently provide "operational" control by determining the size and position of the tracing window. When a marker is "lost" by a smart camera (e.g., when the marker is hidden by a viewer's hand, or another viewer, or some item), the computer transmits into this camera information allowing it to "catch" the marker again, so the marker tracing may be resumed.

Increase in the Number of Tracking Cameras

Three or more tracking cameras are used in a multi-user implementation of the LCMP3D system. In comparison to the usual number of cameras (one or two) in existing MP3D systems, this solution allows substantial increasing tracking reliability, when markers are accidentally hidden from cameras, and it allows providing an effective algorithm of filtering interfering fight sources (heaters, incandescent lamps, flashes and rangefinders of photo cameras and video cameras, etc.). Moreover, it allows increasing accuracy of marker positioning. The closer a marker is located to a camera, the more pixels are in its picture in the frame, so the subpixel positioning algorithm works more precisely. This allows defining weight factors for positioning data acquired from different cameras and using these factors for determination of the viewer position. In particular, data obtained from a camera located closer to a marker contributes more to generation of the final result.

ALAP Rendering

Figure 1B:
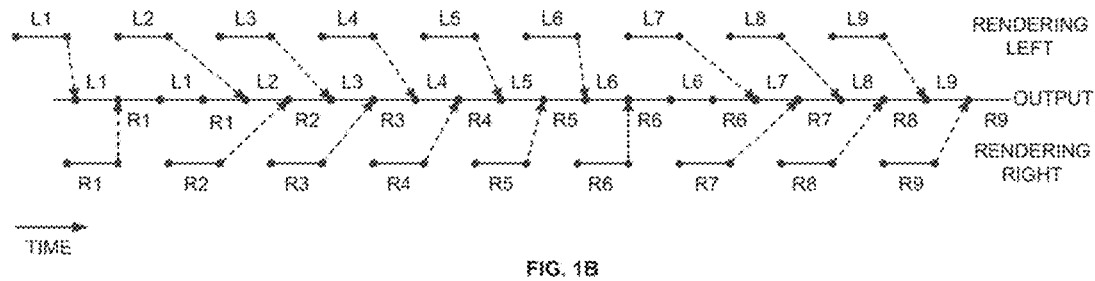

In an optimized MP3D system, the rendering time shall not exceed the time of output of a frame to a screen (e.g., 8.3 ms for MP3D system having frame refresh rate of 120 Hz). Otherwise a situation occurs, when the output frame buffer is modified exactly during the output, thus causing displaying a composite frame consisting partially of one frame and partially of another frame. FIG. 1A shows a situation, when rendering frames L2, L3, L7, L8 for left eye and frames R2, R3, R7, R8 for right eye is finished during output of the previous frame for corresponding eye. Therefore, the viewer observes composite frames L1/L2, L2/L3, L6/L7, L7/L8 for left eye and composite frames R1/R2, R2/R3, R6/R7, R7/R8 for right eye, so an effect of object jitter in the image may be seen when the viewer moves relative to the object. Moreover, the image object jitter effect upon the viewer movement relative to the image also occurs due to displaying frames with different lag relative to the due moment of displaying. As it can be seen from FIG. 1A, lags $\Delta tL1$, $\Delta tL4$, ΔtL5, ΔtL6, ΔtL9 are observed in frames L1, L4, L5, L6, L9 for left eye and lags ΔtR4, ΔtR5, ΔtR9 in frames R4, R5, R9 for right eye. Only frames R1 and R6 for right eye are represented correctly. The first problem (frame irregularity) may be solved by vertical synchronization, but it makes the second problem (object jitter) even worse. FIG. 1B shows a situation, when composite frames are excluded, but some lag exists in each frame except for frames R1 and R6 for right eye, while frames L1 and L6 for left eye and frames R1 and R6 for right eye are displayed twice.

However, even if the rendering time of a single frame is substantially less than output time of the frame, a situation occurs, when a frame is already rendered, but the system is still not ready to output it (e.g., output of a frame for another eye is in progress). Therefore, some waiting occurs between the moment of readiness of the frame and the start moment of output of the frame, whereas some already rendered frames may be skipped at all, which also contributes to the image jitter.

Figure 2A:
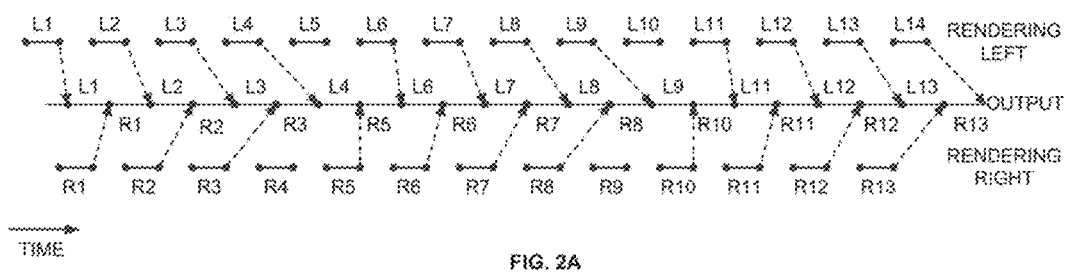
FIG. 2A shows a conventional rendering method in which the frame rendering time does not exceed the time of displaying the frame on the screen.

FIG. 2A shows a situation, when the waiting time is increased for frames L1, L2, L3, L4, and frame L5 is dropped from the representation sequence, afterwards the waiting time is increased for frames L6, L7, L8, L9, and frame L10 is dropped from the representation sequence and so on. Similarly, the waiting time is increased for frames R5, R6, R7, R8, and frame R9 is dropped from the representation sequence. Besides the image jitter, this leads to extra computational load for the GPU, as time is partially spent for rendering those frames, which will not be represented on the screen. All these disadvantages may be eliminated by using ALAP (As Late As Possible) rendering, a method, in which the frame rendering duration is forecasted based on parameters of the scene complexity and the GPU performance and the start moment of rendering is calculated so as to assure that the frame will be fully rendered just before the start of output of the frame to a display device.

Figure 2B:
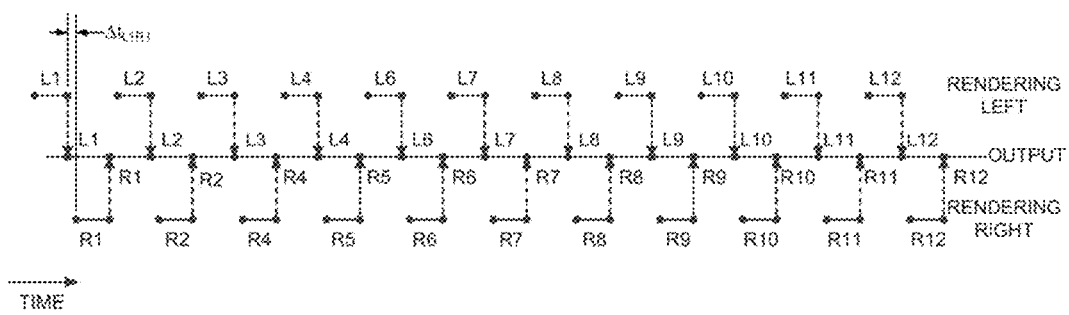
FIG. 2B shows an ALAP rendering method, in which the frame rendering time does not exceed the time of displaying the frame on the screen.

FIG. 2B shows ALAP rendering, wherein the start moment of rendering each frame (e.g., R1) is shifted relative to the end moment of rendering the previous frame (e.g., L1) by a certain value (e.g., ΔtL1R1). This allows almost completely avoiding the previously mentioned additional lag caused by waiting for frame output and also eliminating the frame jitter. Moreover, using ALAP rendering allows extrapolating marker coordinates based on extremely fresh data obtained from cameras, which facilitates increasing accuracy of prediction of the viewer position.

Calibration of Tracking Means

Calibration by spot cloud is used in the LCMP3D system. The initial data for the calibration algorithm is a sequence of data obtained from uncalibrated tracking means, i.e., it is enough to move an operational (switched on) marker in the view scope of cameras for about 30 seconds, and the whole calibration procedure takes about five minutes. Further, the data generated during normal operation of the LCMP3D system is usually quite sufficient for performing self-diagnostics of the tracking means, performed in order to provide control of tracking accuracy and reliability.

Figure 3:
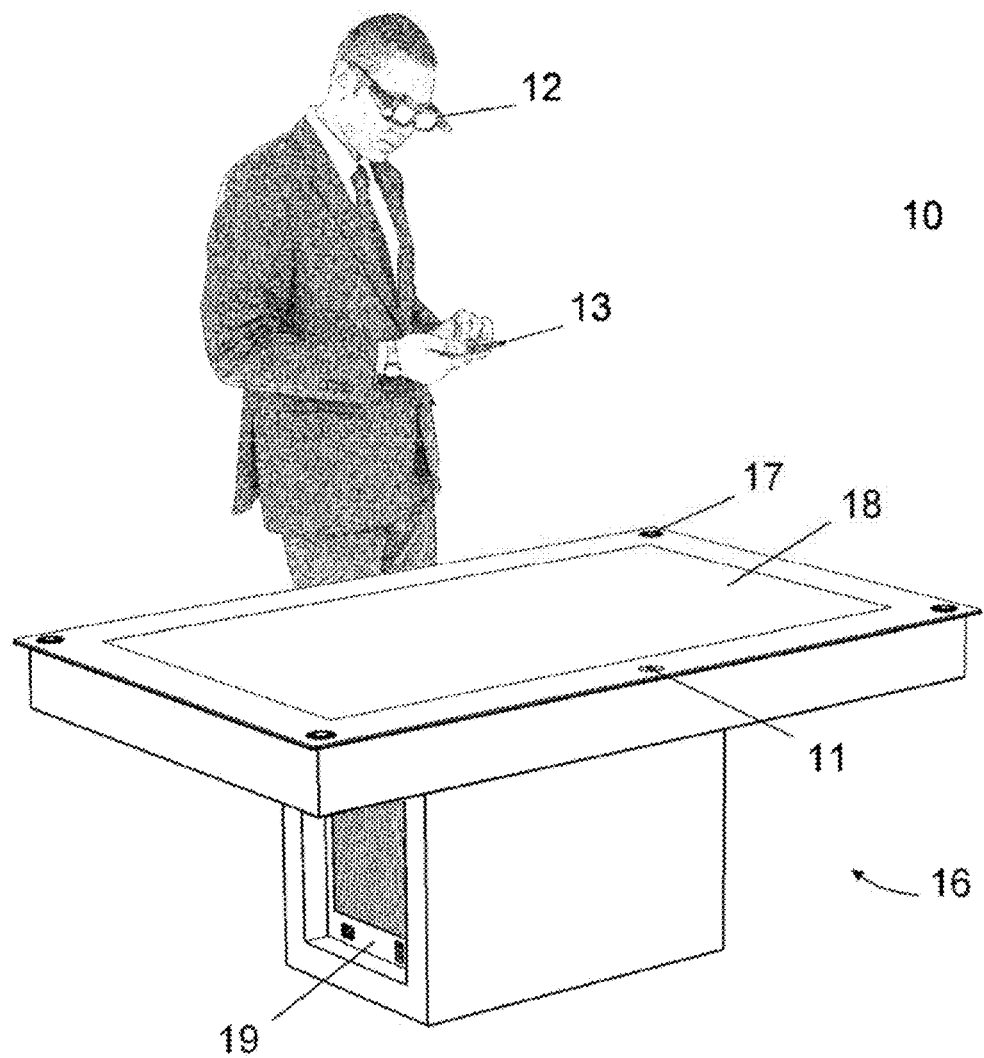
FIG. 3 shows a general view of an LCMP3D system in one embodiment of the invention.

FIG. 3 shows a general view of an embodiment of the invention in a form of a demo desk for three-dimensional presentations. An LCMP3D system (10) comprises a supporting framework (16), a display (18), four smart tracking cameras (17), a computer (19), one or more pairs of glasses (12), and one or more manipulators (13) for the viewers. A viewer may see a three-dimensional image on the display (18) through the glasses (12), while the image is correctly modified according to position of eyes of each viewer upon the viewer's movement nearby the desk in the upper hemisphere above the surface of the display screen.

Figure 4:
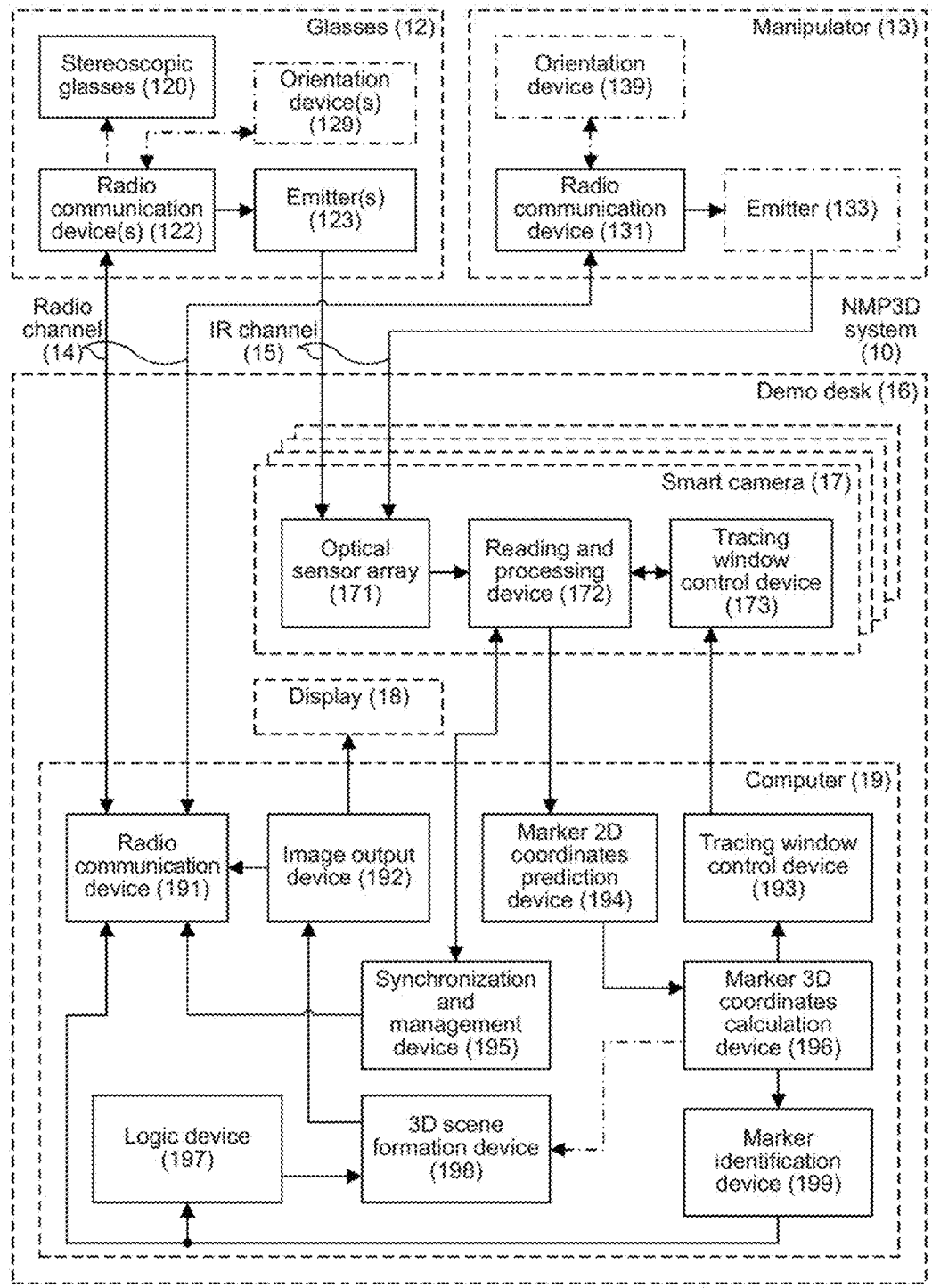
FIG. 4 shows a functional diagram of an LCMP3D system in one embodiment of the invention.

FIG. 4 shows a functional diagram of an LCMP3D system in an embodiment of the system of FIG. 3. In order to facilitate understanding the invention, FIG. 4 shows just those devices, which are specific for this exact implementation of the LCMP3D system (10). The display (18), the four smart tracking cameras (17), and the computer (19) are mounted in the supporting framework (16). Moreover, at least one pair of glasses (12) is included in the LCMP3D system (1.0). At least one manipulator (13) may be used for control of virtual objects. It should be noted that the LCMP3D system (10) also comprises other components needed for functioning the system. In particular, the glasses, the manipulators, the computer and the smart cameras comprise, when necessary, power sources, indication and control means, interfaces, data transmission lines, supporting and enclosing frameworks, as well as other components assuring fulfillment of technical, ergonomical, and aesthetical requirements.

The display (18) is a plasma panel with a 1268 mm screen (diagonal) providing a picture size of 1280×720 pixels at 120 frames per second, a dynamic contrast of 5000000:1, and an internal delay of about 30 ms, for example, TH-50PF50E (Panasonic, http://www.panasonic.com/). Besides plasma panels, other types of displays providing the same or better parameters may be used.

It should be noted that a display having the above-stated parameters provides good quality of a stereoscopic image for one viewer (with frame refresh rate of 60 Hz and on-off ratio of 2 for each eye of the viewer). Commercial availability of enhanced displays and image transfer interfaces will allow increasing the number of users of the LCMP3D system (10) with no substantial improvement of the architecture and operational principles of the system. In particular, using a HD (High Definition) display with image output rate of 240 frames per second will provide good quality of a stereoscopic image for two viewers, whereas 360 frames per second will be fine for three viewers.

The computer (19) is a general-purpose computer having traditional architecture and it comprises, inter alia, some specialized software of the LCMP3D system. Functions of the devices within the computer (19) shown in FIG. 4 are implemented by a combination of hardware (both general purpose and customized), general purpose software (when applicable), and application-specific software of the LCMP3D system (10).

A radio communication device (191) is intended for providing communication between the computer (19) at one side and the glasses (12) and the manipulator (13) at the other side. In one embodiment of the invention, a radio channel (14) operates in the range of 2.4 GHz with GFSK modulation and provides stable communication coverage of about 10 m; it is implemented based on radio channel controller nRF24L01 and Enhanced ShockBurst protocol (Nordic Semiconductor, http://www.nordicsemi.com/). The radio channel (14) may also be implemented based on other similar technical solutions.

A marker 2D coordinate prediction device (194) predicts positions of marker pictures in the frame of each tracking camera, based on data obtained from the tracking cameras, for a certain moment in the future, thus implementing compensation of the overall delay. It should be noted that using the prediction imparts stochastic nature to the determination of the viewer position.

A marker 3D coordinates calculation device (196) calculates coordinates of markers in the three-dimensional space.

Figure 5:
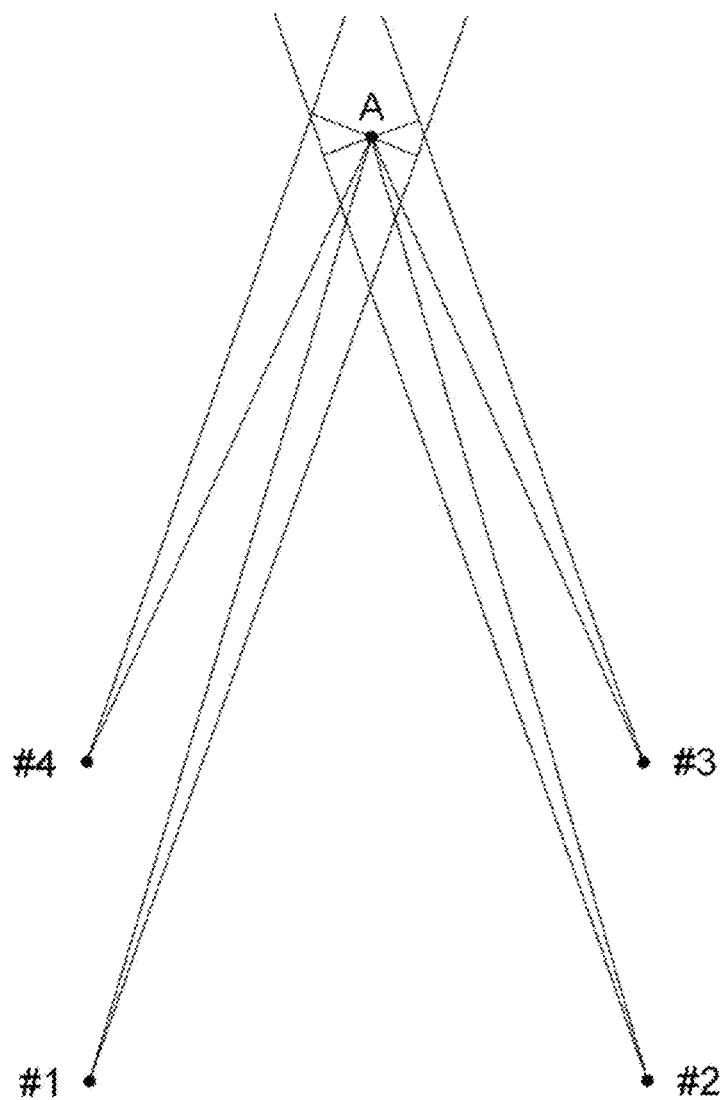
FIG. 5 shows a method of calculation of 3D coordinates of markers in one embodiment of the invention.

The calculation concept is illustrated in FIG. 5. The marker 3D coordinate calculation is performed based on marker 2D coordinates obtained using data regarding the reference point position, and based on the lens function and the value of angular misalignment of each camera. The reference point is a point of intersection of the principal optic axis of the lens and the working face of the optical sensor array in a tracking camera. The lens function represents the dependence of position of a point on the working face of the optical sensor array in a tracking camera on an angle between a ray passing the center of the working face of the optical sensor array and a point of tentative center of a marker, and a normal to the working face of the optical sensor array. Generally, the lens function is non-linear and asymmetrical and depends on optical parameters of the tracking camera lens and on adjustment of the lens relative to the optical sensor array. The angular misalignment is a complex parameter including an angular deviation of actual position of the principal optic axis of the camera lens from the axis position defined in the camera setup, and an angle of rotation of the camera optical sensor array relative to the position defined in the camera setup.

For each tracking camera (in this case, four cameras #1, #2, #3, #4), a direction to the marker center point is determined based on the marker 2D coordinates, the lens function, and the angular misalignment values. In an ideal system, all rays corresponding to these directions should cross at the marker center point. In a real system, even considering calibration, these rays may pass close enough to each other in a space area near the marker center point without crossing. Therefore, a certain point A is defined as the crosspoint, in which the root-mean-square distance between the rays is minimal.

A tracing window control device (193) determines parameters (when needed) of the tracing window (size and position within a frame) based on the marker 3D coordinates, which parameters are transmitted to a tracing window control device (173) in a smart camera (17) for using by a signal reading and processing device (172) when data from an optical sensor array (171) is read. Moreover, the marker 3D coordinates are used by a 3D scene formation device (198) as input data, directly or after processing thereof by a logic device (197). The direct use of the marker 3D coordinates is possible in a single-user implementation of the LCMP3D system (10), wherein one pair of glasses is used and the manipulator does not contain markers.

For a multi-user implementation of the LCMP3D system (10), wherein several pairs of glasses and, possibly, several manipulators equipped with markers are used, data obtained from the marker 3D coordinates calculation device (196) is processed by a marker identification device (199), in which it is determined if a marker belongs to a certain device (glasses or manipulator), and by the logic device (197), in which the game logic (i.e., the game rules) and the physical logic (i.e., the laws of nature) are observed. Further, data from the marker identification device (199) comes to the 3D scene formation device (198). Data from the marker identification device (199) may also be transferred to the radio communication device (191) of the computer for providing control over markers (in particular, for selective blanking certain markers or preventing lighting markers on in order to facilitate identification of markers during initialization or when a tracking failure occurs).

An image output device (192) provides generation of an image signal output to the display (18), the signal constituting a sequence of images for left and right eyes of the viewer or several viewers in a multi-user LCMP3D system (10), based on information obtained from the 3D scene formation device (198).

A synchronization device (195) provides universal time for the computer (19), glasses (12), manipulators (13), and smart cameras (17), as well as synchronization of shutter operation in the cameras and lighting markers.

Figure 6:
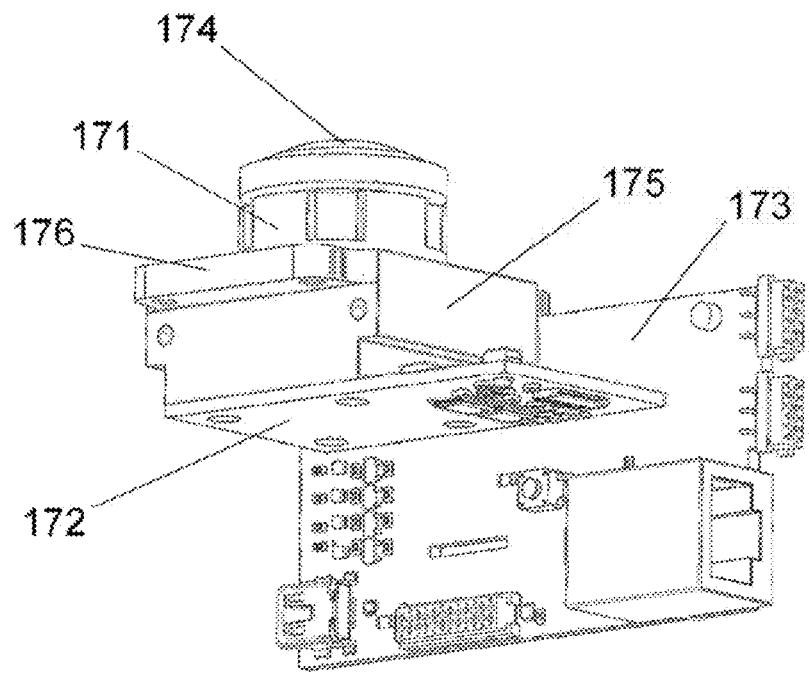
FIG. 6 shows a general view of a smart camera in one embodiment of the invention.

Smart cameras (17) are intended for tracking position of the markers. One implementation example of the smart camera (17) is shown in FIG. 6. The smart cameras (17) are located in the upper part of the supporting framework (16), and the lenses (174) of the cameras are positioned substantially in the plane of the display (18) screen near the corners thereof and directed upwards. The optical sensor array (171) of the smart camera (17) is equipped with the lens (174) and is mounted on a base (175) having two flanges (176) for securing to the supporting framework (16) of the desk. The flange mounting of the smart camera (17) provides a rigid structure necessary for ensuring a high tolerance of the LCMP3D system to vibration and shock load. The smart camera (17) also comprises the reading and processing device (172) and the tracing window control device (173). Moreover, the smart cameras (17) may be equipped with narrow-band light filters to decrease effect of interfering light sources on the tracking means. The tracing window control device (173) also contains means for transmission information via a communication line connecting the smart cameras (17) to each other and to the computer (19).

Figure 7A:
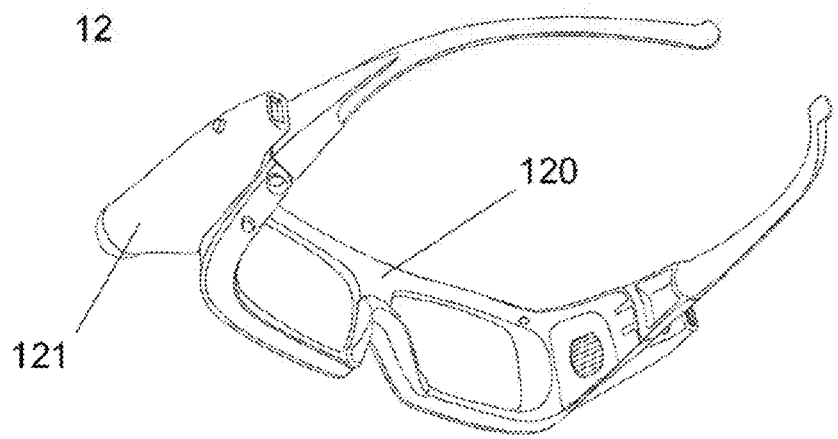
FIG. 7A shows a general view of glasses in one embodiment of the invention.
Figure 7B:
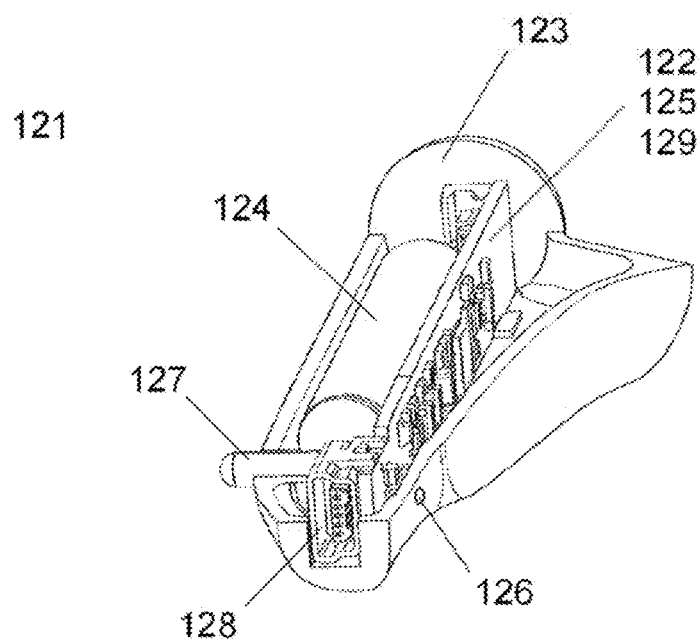
FIG. 7B shows a general view of a marker with partially removed shell in one embodiment of the invention.

Glasses (12) are intended for time separation of a stereoscopic image for left and right eyes of the viewer. FIG. 7 shows one implementation example of the glasses (12) comprising stereoscopic glasses (120) and markers (121). The stereoscopic glasses (120) contain optical shutters and control means for the optical shutters. The stereoscopic glasses (120) themselves are well-known in the art, so a detailed description thereof is omitted.

In this embodiment of the invention, the glasses (12) are implemented based on stereoscopic glasses (120) XPAND Universal 3D Glasses (X6D Ltd, http://www.xpand.me/), which are additionally equipped with two markers (121). In this case, the stereoscopic glasses (120) are controlled via IR control signal, i.e., synchronization of the glasses optical shutters with the display (18) is done by an IR signal emitted by an IR light source (11) (see FIG. 3). The glasses (12) may be implemented based on other stereoscopic glasses of similar design and performance, like 3D Vision 2 Wireless Glasses (NVIDIA Corp., http://www.nvidia.com/), controlled by an IR-channel or a radio channel (e.g., using Bluetooth).

The marker (121) comprises a control circuit (125), at least one emitter (123), at least one power source (124), at least one radio communication device (122), at least one marker operation mode indicator (126), at least one marker operation control button (127), and at least one electric connector (128). Additionally, the marker (121) may comprise an orientation device (129). The emitters (123) may be equipped with narrow-band light filters to decrease effect of interfering light sources on the tracking means.

The glasses and markers may be manufactured as an integral device and may have shared control channels (e.g., a radio channel), a shared power source and a shared charge connector. In another embodiment of the invention, the glasses may be provided without the charge connector; in this case the power source may be charged using induction. The glasses may be provided without any control buttons and may go into in a standby or sleep mode, when not used; in this case the marker light on and optical shutter switch orders are transmitted via the control channel. Additionally, the glasses may contain other devices like acoustic emitters, vibration sources, and augmented reality displays furnishing the user with additional information in some numerical, text, or pictorial form.

The control circuit (125) controls the IR signal emitter (123). Each marker is controlled by the radio communication device (122) via the radio channel (14). The marker operation mode indicator (126) is intended for indication of the operational state of the marker and power source (124) charge level. Information regarding the charge level of the power source (124) may be transmitted to the computer via the radio channel and may be indicated on a control panel. Marker switching on and off and switching the marker operation modes, when necessary, is done by the button (127). Charging the power source (124) is performed via the electric connector (128); the same connector may be used for configuring and diagnosing the marker (121).

The manipulator (13) is intended for exerting influence on the image and/or the game process. The manipulator (13) may comprise some control means (like buttons, keys, joysticks, trackballs, touchscreens, etc.), which are well-known in the art, so a detailed description thereof is omitted. In a game-oriented LCMP3D system (10), the manipulator (13) may be an article representing an arm or a tool, which a player holds in their hand, otherwise it may be a token or a collar to be fixed on a certain part of the player's body, or any other device reasonable from the game story and game-play point of view.

It should be noted that FIG. 4 shows a functional diagram of a manipulator intended for acting as a target designation means (i.e., for influencing predetermined image parts). Such a manipulator (13) is equipped with markers (132) comprising emitters (133) and it allows the system (10) to track position of the manipulator and its orientation in space. If a manipulator is used for tracking position and orientation in space for the viewer's body or body portion, then such a manipulator may comprise one marker (132). If a manipulator is used for influencing the whole image (e.g., rotation, translation, zoom-in, zoom-out, etc.), then tracking position and orientation in space are not required, therefore marker (132) may be absent.

An orientation device (139) comprises devices that allow the LCMP3D system (10) to determine not only the manipulator position, but also its orientation in space. The orientation device (139) may comprise at least one of the following devices: a gyroscope, an accelerometer, a magnetometer. Using a combination of orientation data obtained from these devices allows more precise determining orientation of the manipulator (13). For example, averaging the accelerometer data for a time period of about 60 seconds allows fairly accurate determining the "down" direction, i.e., towards the Earth mass center and compensating for the gyroscope data drift. Using a high-speed solid-state magnetometer in an artificial magnetic environment having a predetermined orientation near the LCMP3D system (10) also allows calibrating the gyroscope. Moreover, combined using a gyroscope, an accelerometer, and/or a magnetometer allows precise extrapolating the manipulator position in space, when one or more markers (132) are hidden from the tracking cameras and reliable optical tracking is not possible. The above-stated concepts for the orientation device (139) of the manipulator are substantially valid for the orientation device (129) of the glasses.

Figure 8:
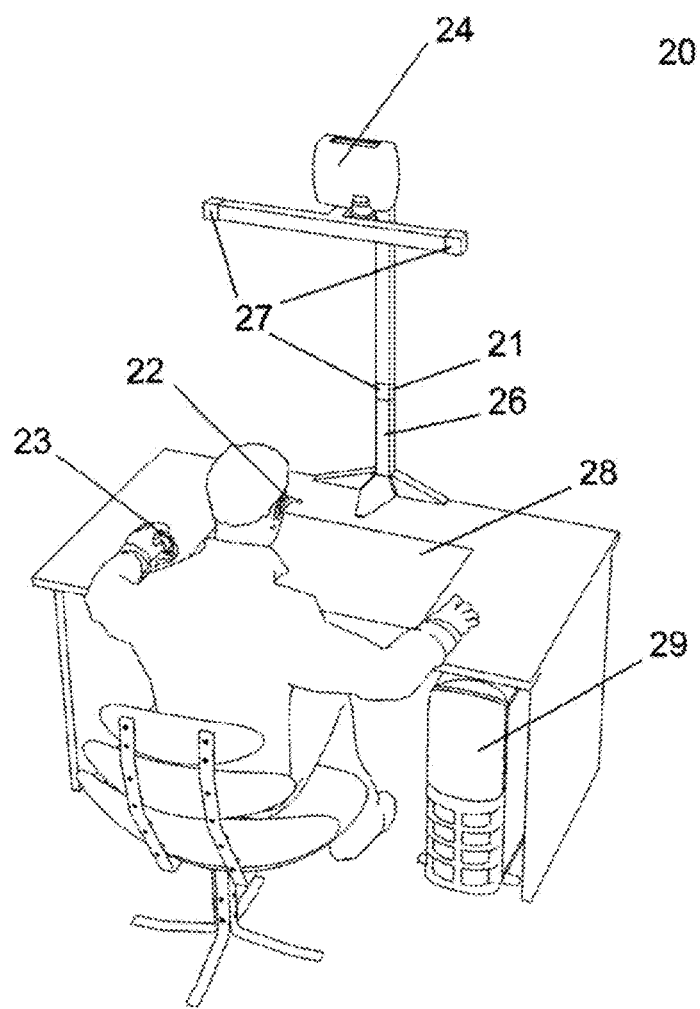
FIG. 8 shows a general view of an LCMP3D system in another embodiment of the invention.

FIG. 8 shows a general view of another embodiment of the invention in a form of a single-user desktop system intended for scientific, engineering, educational or entertaining purpose. An LCMP3D system (20) comprises a supporting framework (26), a projector (24), three smart cameras (27), a computer (29), glasses (22), and one or more manipulators (23) for a viewer, as well as an IR signal source (21) for synchronization of optical shutters of the glasses (22). The viewer may see a three-dimensional image on the projection screen (28) located on the desk working surface through the glasses (22), while the image is correctly modified according to position of eyes of the viewer upon the viewer's movement nearby the desk in the upper semi-sphere above the surface of the screen. A DLP projector providing a picture size of 1280×720 pixels at 120 frames per second, dynamic contrast of 3000:1, and average response time of about 8.5 ms, e.g., WD720U (Mitsubishi, http://www.mitsubishi.com/), may be used as the projector (24). Instead of the optical front projection system, a rear optical projection system may be used, wherein the projector (24) is located under the desk working surface, into which a rear projection screen (28) is integrated. Instead of synchronization of optical shutters of the glasses via an IR channel, synchronization via a radio channel may be used.

Using three smart cameras (27) in the LCMP3D system (20) of FIG. 8 provides a high reliability of tracking the viewer position, however, the LCMP3D system (20) of FIG. 8 maintains its operational integrity when just two smart cameras (27) are used, as hiding markers of the glasses (22) from the smart cameras (27) by any objects is unlikely in such a system.

Figure 9:
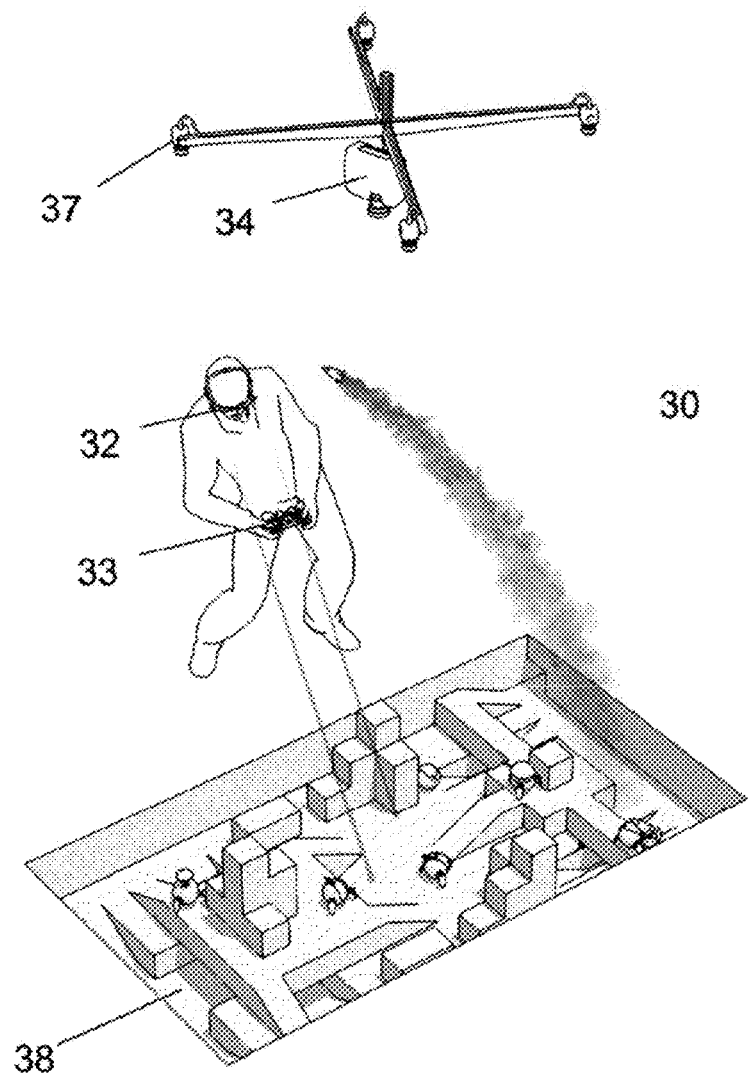
FIG. 9 shows a general view of an LCMP3D system in still another embodiment of the invention.
Figure 10:
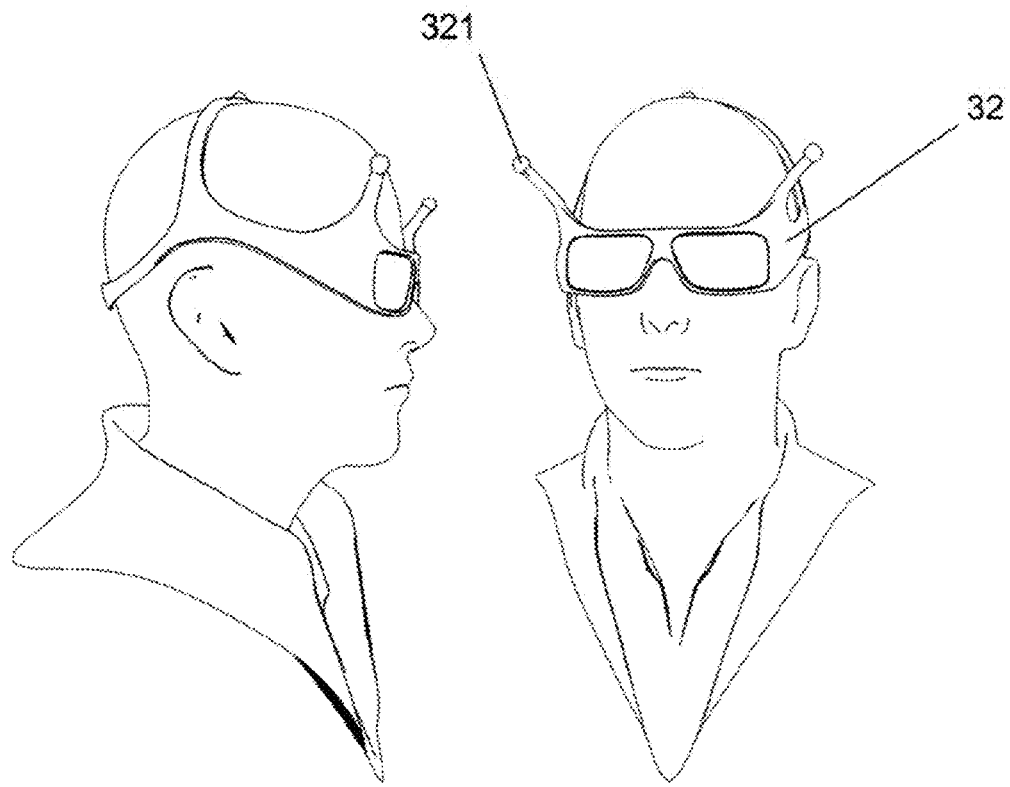
FIG. 10 shows a general view of glasses in another embodiment of the invention.

FIG. 9 shows a general view of still another embodiment of the invention in a form of a single-user or multi-user floor-level game system. Generally, an LCMP3D system (30) is structurally and functionally similar to the system of FIG. 8, but differs by its form-factor, i.e., it comprises a bigger size screen (38), which may be a front or rear projection panel disposed on the floor surface or integrated into the floor or deck; it also may be a plasma or LCD panel (or several seamlessly tailored panels) integrated into the floor or deck. In particular, FIG. 9 shows an LCMP3D system (30) using front projection from a projector (34). The LCMP3D system (30) also differs from the LCMP3D system (20) in the number of the tracking cameras (37) (at least four) and disposition of the cameras (above the game area, e.g., on the room ceiling or on masts, towers or any other supporting framework located inside or outside the premises). Another difference is using glasses (32) of different design (refer to FIG. 10), wherein markers (321) are located as to provide minimal shadowing (hiding) thereof by any other articles, when the viewer moves, and thus to provide maximal freedom of the viewer's movement and still ensure reliable tracking position of the markers. One more difference is using a manipulator (33) comprising an orientation device like the above-mentioned orientation device (139).

Figure 11:
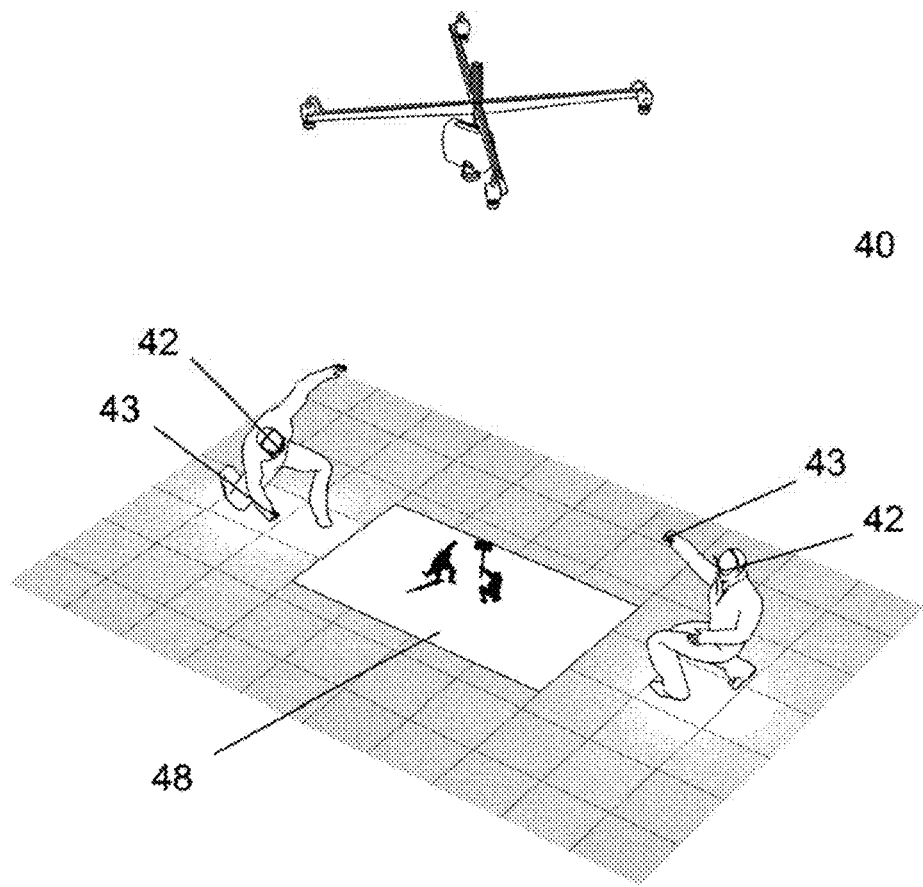
FIG. 11 shows a general view of an LCMP3D system in one more embodiment of the invention.

FIG. 11 shows a general view of one more embodiment of the invention in a form of a multi-user floor-level game system. Generally, an LCMP3D system (40) is structurally and functionally similar to the system of FIG. 9, but differs by that tracking position of markers of glasses (42) and at least one manipulator (43) of each of the viewers (in this case players) allows fairly accurate tracking the change of spatial position and posture of at least one body portion of each player in order to provide playback on a screen (48) in a form of a related game character changing its spatial position and posture, correspondingly. It should be noted that compensation of the overall delay in the LCMP3D system (40) provides an absence of noticeable geometric image distortions, and also ensures synchronism of movements of a player and the related game character.

The embodiments of the invention represented in the above in the form of LCMP3D systems (10, 20, 30, 40) having one display or several displays disposed in one plane may also be implemented in the form of LCMP3D systems (10, 20, 30, 40) having one display or several displays disposed in different planes, e.g., in a form of CAVE (Cave Automatic Virtual Environment) rooms, etc., as well as having one display or several displays with nonplanar displays, e.g., displays forming a hemispherical screen in order to provide IVR (Immersive VR) systems.

Figure 12:
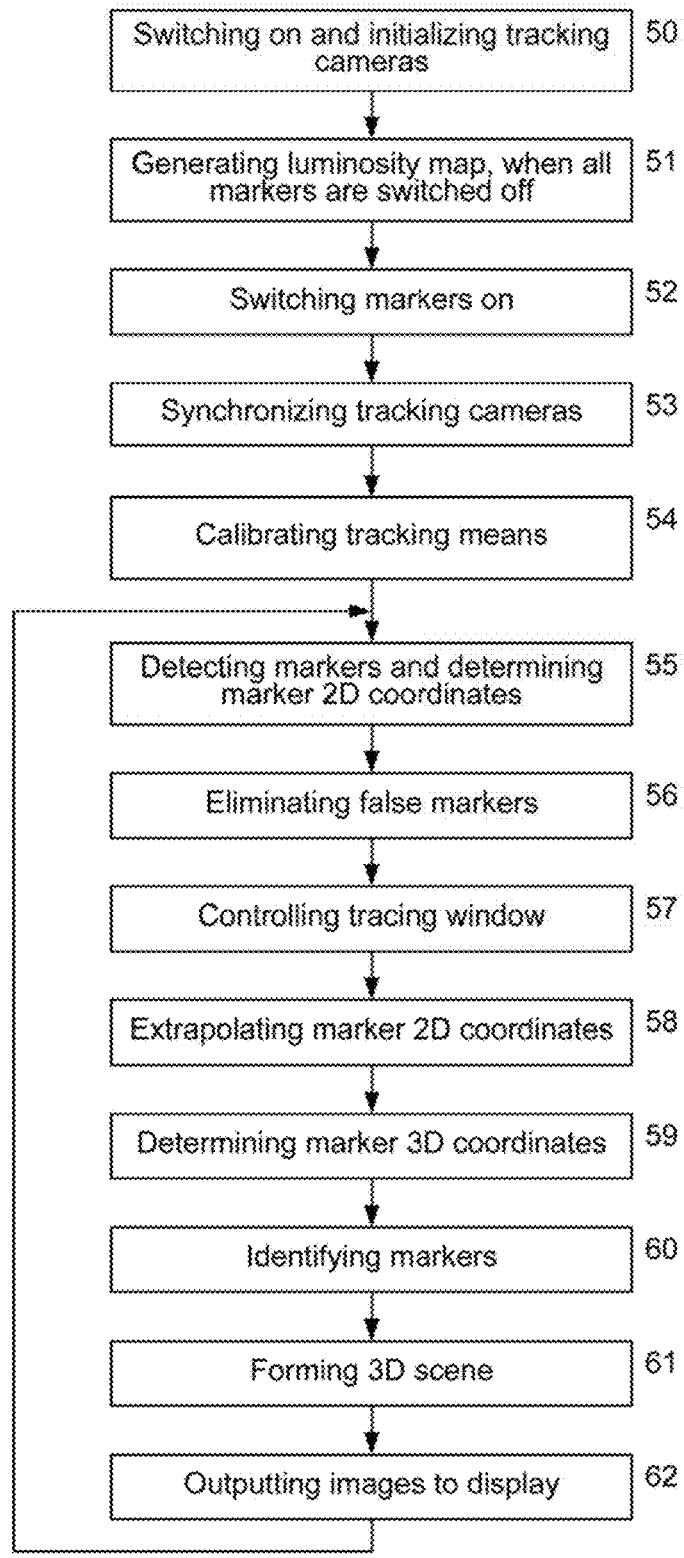
FIG. 12 shows a process of displaying three-dimensional objects, the process implemented in an LCMP3D system in one embodiment of the invention.

A method of displaying three-dimensional objects in an LCMP3D system is illustrated by a flowchart diagram in FIG. 12.

In step (50), switching on and initializing tracking cameras are performed.

In step (51), generation of a luminosity map is performed when all markers are switched off. This is necessary for determination of interfering irrelevant IR light sources and for excluding (or at least decreasing) their effect on marker tracking accuracy. Filtering of the irrelevant IR light sources is done by subtraction of a picture obtained from tracking cameras, when the markers are switched off, from a picture obtained from tracking cameras, when the markers are switched on. In order to increase reliability of the filtering, generation of a luminosity map is performed under increased exposure relative to the working exposure.

In step (52), switching markers on is performed by an order from a computer, transmitted via a radio communication device of the computer.

In step (53), synchronization of tracking cameras is performed by a command from a computer, transmitted via the synchronization device. If a user is moving and the tracking cameras operate asynchronously, they capture marker positions in different moments and, correspondingly, in different places. Therefore, reliability of marker 2D coordinates calculated in step (55) deteriorates, which leads to decrease of accuracy of extrapolation of the marker 2D coordinates; in turn, this causes "blurring" of the marker 3D coordinates calculated in step (58), which results in decrease of accuracy of tracking the viewer position, thus degrading the realism of a three-dimensional image. Providing universal time for all smart cameras, glasses, markers and the computer is important for maintaining synchronization.

When operation of the NMP3D system is synchronized, commands for reading frames and switching a corresponding marker or corresponding markers are sent in advance. This command may be sent by one tracking camera, which is a master for other tracking cameras; otherwise this command may be sent by a synchronization device.

In step (54), calibration of tracking means is performed. The calibration results in data regarding the reference point position, the lens function and the angular misalignment values for each camera. Further, the reference point position data is transferred to the corresponding smart cameras, and the lens function and the angular misalignment values for each camera are transferred to the computer.

In step (55), detection of markers in pictures obtained from optical sensor arrays of the tracking cameras is performed; further, marker 2D coordinates are determined, i.e., their positions in the coordinate grid of corresponding frames of the tracking cameras are calculated. The marker detection and 2D coordinates determination process are further discussed in detail with reference to FIG. 13.

In step (56), elimination of false markers is performed. False markers are irrelevant IR light sources, pictures of which in the frame are similar to the real marker pictures, so they are not discarded in the process shown in FIG. 14. In order to eliminate false markers, pictures of frames without predetermined markers are used, the markers switched off for a while by command from a marker identification device. The pictures of such special frames, in which predetermined markers are absent, while interference signals are present, are used for excluding (or at least decreasing) effect of the irrelevant IR light sources, e.g., by way of subtracting pictures thereof from pictures of regular working frames. In order to decrease use of resources, it is preferable to read pictures of these special frames only within the tracing window.

In step (57), control of the tracing window is performed. The tracing window control process is further discussed in detail with reference to FIG. 14.

In step (58), extrapolation of the marker 2D coordinates is performed in order to provide compensation of the overall delay. As a simplified approach, extrapolation of the marker 2D coordinates is a linear extrapolation. As a more complicated approach, a non-linear extrapolation may be used, e.g., cubic extrapolation, bicubic extrapolation, spline extrapolation, etc. The extrapolation algorithm may be selected automatically depending on expected movement manner of the viewers and the computer workload in a certain configuration of the LCMP3D system. Dependence of the extrapolation algorithm on expected movement manner of the viewers is determined by the fact, that accelerated motion is less predictable than uniform motion. The extrapolation horizon is defined by the overall delay value in a certain configuration of an LCMP3D system, and it is selected so as the effective overall delay in an LCMP3D system using extrapolation would not exceed 5 ms. For example, in one embodiment of the LCMP3D system (10), the non-compensated overall delay is about 50.6 ms, including 4 ms for tracking means operation, 8.3 ms for formation of three-dimensional scene, 38.3 ms for representation of the image on a display, therefore, the extrapolation horizon in such a system is about 45.6 ms.

In step (59), determination of the marker 3D coordinates is performed, i.e., their position in the three-dimensional space is calculated. The marker 3D coordinates are calculated based on extrapolated marker 2D coordinates determined for each of the tracking cameras. The calculation is performed in the computer using the calibration results, namely lens function and the angular misalignment values.

It should be noted that in one embodiment of the invention, extrapolation of the marker 3D coordinates may be used instead of extrapolation of the marker 2D coordinates, i.e., current 2D coordinates of markers may be transferred to the computer, where 3D coordinates of markers may be determined based on the 2D coordinates, so the 3D coordinates may further be extrapolated in a marker 3D coordinates prediction device (not shown in FIG. 4). In another embodiment of the invention, extrapolation of 2D coordinates of the markers may be performed in smart cameras (in this case the cameras comprise marker 2D coordinates prediction devices not shown in FIG. 4), and extrapolation of the marker 3D coordinates may be performed in the computer, wherein different algorithms and/or different extrapolation horizons may be used for extrapolation of 2D coordinates and 3D coordinates of the markers. In one more embodiment of the invention, extrapolation of 3D coordinates of the markers may be totally or partially performed in smart cameras. Selection of the extrapolation mode (2D/3D) and the extrapolation algorithm (linear/non-linear) may be done automatically, depending on expected movement manner of the viewers and the workload of processors of the smart cameras and/or the computer in a certain configuration of the LCMP3D system.

In step (60), identification of markers is performed. Identification of markers is not mandatory in the LCMP3D systems (10) and (20) in the single-user mode without using manipulators equipped with markers. In other cases identification of markers is required. In the single-user mode of the LCMP3D systems (10) and (20), it is assumed that the left marker is always located on the left of the viewer's eyes, and the right marker is always located on the right of the viewer's eyes, i.e., the glasses are not turned upside down. In the LCMP3D systems (10) and (20) in the multi-user mode, and in the LCMP3D systems (30) and (40) turning of the glasses upside down may occur, which is caused by necessity of providing freedom of movements of players, according to the game story, and/or by possible appearance of the player's excitement. In these systems, overturn of the manipulators upside down may also occur, including those equipped with more than one marker. Identification of markers is done by the marker identification device. In particular, a pause in light emission of a marker is used for initial identification of markers, which is provided at a predetermined moment and lasts for a predetermined time (e.g., the marker may stay switched off during one interval of regular working thereof), which allows determining a marker that was lost and subsequently appeared again. Further, identification of markers is performed by tracing the marker shift within the frame. When necessary, recurrent identification of markers may be done in a similar way to the initial identification of markers, as disclosed in the above.

In another embodiment of the invention, identification of the markers may be performed by collation of previously known information regarding mutual spatial position of markers belonging to a certain device (glasses or manipulator) with calculated 3D coordinates of the markers, while each device may comprise more than two markers. In this embodiment, each device is characterized by a unique arrangement of the markers. This option may be used, e.g., when marker identification by tracing marker movements within the frame is not reliable due to high motion activity of the viewers, and frequent using recurrent identification of markers by pausing light emission of a marker is undesirable.

In step (61), formation of a 3D scene, i.e., generation of images for each eye of each viewer, is performed. A special software (a so-called 3D engine) is responsible for formation of a 3D scene, e.g., using the Unity 3D engine (Unity Technologies, http://unity3d.com/) is enough for the LCMP3D systems (10) and (20), whereas a customized 3D engine supporting several GPUs (preferably with open source code) is expedient to be used in LCMP3D systems having composite screens (so-called multiscreen), which customized 3D engine may be designed in-house or outsourced.

In step (62), output of images to a display is performed. Images for each eye of each viewer are outputted in a proper order, while synchronization of the stereoscopic glasses is provided.

Figure 13:
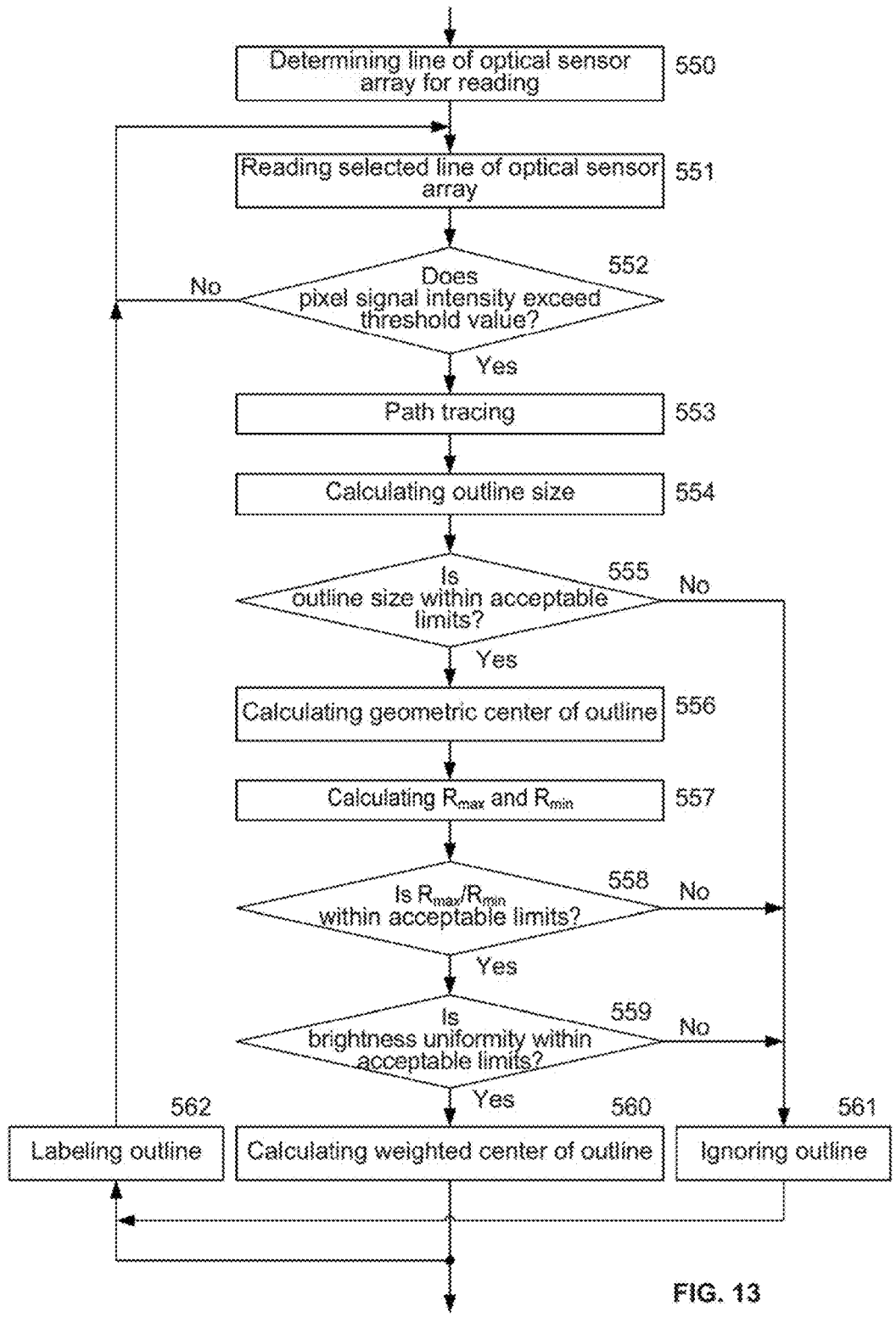
FIG. 13 shows a process of finding markers and determination of their 2D coordinates, the process implemented in an LCMP3D system in one embodiment of the invention.

FIG. 13 shows a process of detecting markers and determining 2D coordinates thereof. This process is performed in each smart camera independently, and it yields data regarding each marker, namely, coordinates of the weighted center of the marker outline in the frame of the tracking camera, the outline size, and an integral parameter of the marker picture brightness, which data is transferred to the computer for further processing.

It should be noted that selection of exposure time is an important factor in this process. The exposure time may be considered optimal, when the brightest point of the marker picture technically corresponds to the upper limit of the camera dynamic range. This allows obtaining the most accurate weighted value of the marker outline center.

It should also be noted that increasing exposure time over the optimal value decreases the camera performance, since obtaining each frame takes more time. Additionally, accuracy of determining 2D coordinates of a moving marker may also decrease due to "blurring" the marker picture. Moreover, appearance of a lot of false markers is likely in this case, since when exposure time is increased, brightness of pictures of irrelevant light sources is increased as well, so it may nearly reach brightness of pictures of true markers, which does not rise due to saturation effect.

Insufficient exposure time leads to reducing radius of the marker picture outline, so the weighted center coordinates of the marker outline is calculated based on less amount of data, therefore accuracy of the calculation is degraded.

Another factor to be taken into consideration regarding this process is that in a fisheye-type wide-angle lens, brightness of the marker picture is much higher for small angle deviation from the lens optical axis, than for large deviation. Therefore, in order to assure uniform brightness of a picture during reading a frame, it is necessary to use a brightness correction factor for each pixel, the factor depending on the distance between the pixel and the reference point.

In step (550), determination of a line of the optical sensor array for reading is performed. In order to assure a required operation speed of the tracking means, only some of the lines (e.g., every second or third line) may be read from the optical sensor array. This "subsampling" allows reducing frame reading time and it is performed depending on exposure time of the tracking camera, which, in turn, depends on the general illumination level. The higher illumination, the more lines may be discarded by the subsampling with no substantial risk of losing a marker.

In step (551), reading the selected line of the optical sensor array is performed and a sequence of signals is generated, corresponding to the pixel brightness in the picture line.

In step (552), the signal intensity (i.e., brightness) of each pixel of the selected line is sequentially analyzed. If the signal intensity of a pixel exceeds a threshold value, this pixel is assumed to belong to the marker picture outline, and the process passes to step (553).

In step (553), detecting the marker picture outline is performed by path tracing, e.g., when pixels in line are read left-to-right and lines in frame are read top-down, the path tracing is done clockwise around each last detected pixel of the outline, starting from the previous verified pixel. The path tracing results in forming a closed outline corresponding to the marker picture border.

In step (554), a size (in pixels) of the outline is calculated.

In step (555), the outline size is checked. If the outline size is within acceptable limits defined by the marker emitter size and the maximal and minimal possible distance between the tracking camera and the marker, then the process passes to step (556). If the outline size is not within the acceptable limits, then the process passes to step (561).

In step (556), a geometric center of the outline is calculated.

In step (557), maximum and minimum radii of the outline (i.e., distance between the geometric center of the outline and its border) are calculated. Generally, the outline may have a shape noticeably different from the round shape, e.g., it may be elliptical. The maximal and minimal radii of the outline enable characterizing the outline shape.

In step (558), a ratio of the maximal and minimal radii of the outline is checked. Excessively elongated outlines, as well as outlines having a shape of a non-convex flat geometric figure shall be discarded. If the ratio of the maximum and minimum radii of the outline is within acceptable limits, then the process passes to step (559). If this ratio is not within acceptable limits, then the process passes to step (561).

In step (559), inspection of brightness uniformity of marker picture (i.e., uniformity of brightness of the area within the outline) is performed. Outlines with dark spots inside thereof shall be discarded. If the brightness uniformity of the area within the outline is within acceptable limits, then the process passes to step (560). If the brightness uniformity of this area is not within acceptable limits, then the process passes to step (561).

In step (560), coordinates of the weighted center of the outline are calculated. The coordinates of the weighted center of the outline are determined considering a brightness gradient on the marker picture border. For example, the weighted center of the outline may be considered as the mathematical expectation point for the marker picture brightness distribution over X and Y coordinates. The calculated coordinates of the weighted center of the outline constitute 2D coordinates of the marker. These coordinates may be determined with subpixel accuracy (about $\frac{1}{30}$ of pixel). Further, the coordinates of the weighted center of the marker picture outline, the marker picture outline size, and (in some embodiments) the ratio of the maximal and minimal radii of the marker picture outline are adjusted based on the reference point position for this exact camera, i.e., these parameters are converted into local coordinates of the camera, wherein the zero point of the local coordinate system is in the reference point. Afterwards, the coordinates of the weighted center of the marker picture outline, the marker picture outline size, and the ratio of the maximal and minimal radii of the marker picture outline are saved in a form of a parameter array of the supposed markers for this frame. In some embodiments, only some of the above-stated parameters may be saved in the parameter array of the supposed markers. After that the process passes to step (562).

In step (561), the outline is ignored, i.e., the analyzed outline is considered defective (not corresponding to a marker) and is excluded from the further consideration. After that the process passes to step (562).

In step (562), labeling an outline is performed. i.e., the processed outline is labeled to exclude it and the area inside it from the further frame analysis, which allows additionally reduce the processing time for each frame and, correspondingly, increase the operation speed of the tracking means.

When reading a frame is finished, data of the parameter array of presumed markers is transferred into the computer (19). In another embodiment, the parameter array of presumed markers may be transferred immediately during the process of reading the frame, according to the calculation progress.

Figure 14:
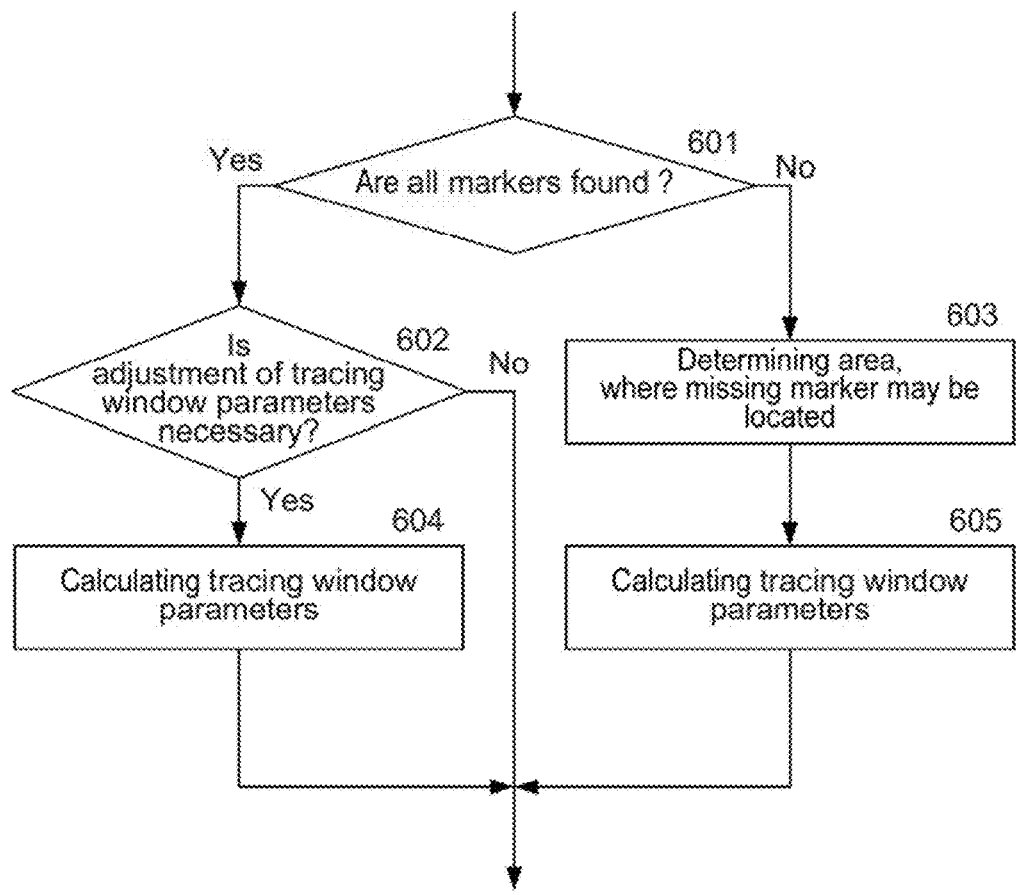
FIG. 14 shows a process of controlling a tracing window of a smart camera in an LCMP3D system in one embodiment of the invention.

FIG. 14 shows a tracing window control process performed in each tracking camera. The tracing window control consists in periodical checking parameters of the tracing window (size and position) and, when necessary, adjusting these parameters. Upon initialization of the system or when all markers are lost, the tracing window size is set to be equal to the entire frame size.

In step (601), checking if all markers are present in the picture obtained from the optical sensor array is performed. It should be noted that sets of markers, which shall be present in pictures taken by different tracking cameras, may differ. If the picture obtained from the optical sensor array contains all the markers, then the process passes to step (602). If the picture obtained from the optical sensor array does not contain all the markers, which should be present therein, then the process goes to step (603).

In step (602), a check is performed, if adjustment of the tracing window parameters is necessary. For example, if a certain marker is found close to the border of the tracing window, this border may be shifted outward, while the size of the shift may depend on the proximity of the marker to the border and on the light spot size of the marker. If a certain marker is found far from the border of the tracing window, this border may be shifted inward, while the size of the shift may also depend on the proximity of the marker to the border. If it is determined in step (602) that adjustment of the tracing window parameters is necessary, then the process passes to step (604). If it is determined that adjustment of the tracing window parameters is not necessary, then the algorithm of FIG. 14 is finished.

In step (604), new parameters of the tracing window are calculated. When calculating the new parameters of the tracing window, at least two criteria are taken into consideration. The first criterion constitutes a condition of minimal total square of tracing windows of all tracking cameras. The first criterion directly affects operation speed of the tracking means. The second criterion refers to a kind of edge condition (i.e., a limitation) taken into account while the total square of tracing windows of all tracking cameras is minimized and it constitutes a condition of approximate equality of squares of the tracing windows of all cameras. The second criterion relates to the situation, when different cameras may have unequal working conditions when tracking certain markers, which directly affect reliability of tracking those markers.

Moreover, the second criterion characterizes a misbalance of computational loads of the smart cameras. If the limitation regarding the square difference of the tracing windows of all cameras is rather soft (which may be typical for a multi-user LCMP3D system), then the misbalance of computational loads of the smart cameras may be significant. In this case the smart cameras may redistribute among themselves the computational loads related to processing pictures of frames, calculating data regarding each marker, and determining parameters of each tracing window. This possibility is provided by a communication line between all smart cameras (not shown in FIG. 4), a corresponding data exchange protocol, and an embedded software of the smart cameras. Such communication lines and data exchange protocols are well-known in the art, so their detailed description is omitted. After completion of step (604), the tracing window parameters are transferred to a corresponding process and the algorithm of FIG. 14 is finished.

In step (603), an area is determined, where a marker missing in a picture taken by a certain tracking camera may be located. Determination of this area is performed by way of comparison of current data (and former data, if necessary) obtained from this tracking camera and other tracking cameras.

Step (605) is substantially similar to step (604). After completion of step (605), the process returns to step (601).

It should be noted that, in order to facilitate comprehension of this invention, FIG. 12 shows only those steps of the above-mentioned method, which are substantial for understanding thereof; however, the method may include other steps ensuring operation of the system. Necessity of such steps is clear to a person skilled in the art and implementation thereof is known to an artisan, so their description is omitted.

A technical result of this invention is providing realistic representation of three-dimensional objects for one or more viewers by using visualization means forming an image on a screen surface and by utilizing at least two main psychological visual mechanisms of spatial perception of images, binocular parallax and motion parallax, at a speed of viewer's motion in the range of 0 m/s to 3 m/s and at an acceleration of viewer's motion in the range of 0 m/s2 to 10 m/s2. The technical result is attained due to providing effective overall delay within 5 ms for the viewer, which is ensured by prediction of the viewer position, i.e., by time extrapolation of 2D coordinates or 3D coordinates of markers. Extrapolation accuracy is defined by parameters of input data used for extrapolation, namely quantity (sample volume), quality (precision and purity) and actuality (age) of the data. Required values of these parameters are assured by implementation of a set of the following interrelated technical solutions: using active controlled markers, using "smart cameras" as the tracking cameras, and using a "tracing window". Increase of the number of tracking cameras, implementation of ALAP rendering and calibration of the tracking means also help in providing required values of these parameters.

Devices, means, methods and portions thereof mentioned herein relate to one or more particular embodiments of the invention, when they are mentioned with reference to a numeral designator, or they relate to all applicable embodiments of the invention, when they are mentioned without reference to a numeral designator.

Devices mentioned in claims constitute combined hardware/software means, wherein hardware of some devices may be different, or may coincide partially or fully with hardware of other devices, if otherwise is not explicitly stated. The hardware of some devices may be located in different parts of other devices or means, if otherwise is not explicitly stated.

Sequence of steps in the method description provided herein is illustrative and it may be different in some embodiments of the invention, if the function is maintained and the result is attained.

Having thus described the different embodiments of a system and method, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method of creating a 3D effect of an image formed on a display device, the method simultaneously providing effects of binocular parallax and motion parallax and comprising steps of:
    utilizing a system comprising a display device, a pair of glasses for stereoscopic separation of images, the glasses comprising two optical shutters and two markers, two optical sensor arrays, two reading and processing devices, a marker 3D coordinates calculation device, a one marker coordinates prediction device, a 3D scene formation device, and an image output device,
    obtaining pictures from the two optical sensor arrays;
    detecting the markers in the pictures;
    determining 2D coordinates of the markers;
    determining 3D coordinates of the markers based on the 2D coordinates of the markers;
    extrapolating coordinates of the markers so that an effective overall delay does not exceed 5 ms;
    forming a 3D scene based on the 3D coordinates of the markers; and
    outputting images of the 3D scene on the display device, wherein the images intended for each eye of a viewer are outputted alternately.

2. The method of claim 1, wherein the markers are light emitting markers.

3. The method of claim 2, further comprising a step of synchronizing the optical sensor arrays with each other and with the markers, prior to the step of obtaining pictures from the two optical sensor arrays.

4. The method of claim 2, further including a step of selective switching the markers on and off, wherein the system further comprises a first radio communication device, and the glasses of the system also comprise a second radio communication device.

5. The method of claim 4, further including a step of generating a luminosity map when the markers are switched off, in order to automatically detect interfering emission sources and exclude their effect on detection of the markers, prior to the step of detecting the markers.

6. The method of claim 1, further comprising a step of controlling a tracing window, wherein the system further includes a tracing window control device.

7. The method of claim 6, wherein the system further comprises a first radio communication device and the glasses also comprise a second radio communication device and an orientation device, and
    wherein data obtained from the orientation device via the first and second radio communication devices is used for determining a size and position of the tracing window.

8. The method of claim 6, wherein the system further comprises a first radio communication device, and a manipulator comprising a second radio communication device and an orientation device, and
    wherein data obtained from the orientation device of the manipulator via the first and second radio communication devices is used for determining a size and position of the tracing window.

9. The method of claim 6, wherein the step of controlling the tracing window includes the following steps:
    checking if all markers are present in a picture obtained from the optical sensor array;
    if all markers are present in the picture obtained from the optical sensor array, passing to a step of checking necessity of adjustment of the tracing window parameters; if not all markers are present in the picture obtained from the optical sensor array, determining an area, where the marker missing in the picture may be located, then determining size and position of the tracing window, and transferring the size and the position of the tracing window for a corresponding step;
    checking if adjustment of the tracing window is necessary; and
    if adjustment of the tracing window is necessary, determining size and position of the tracing window, and transferring the size and the position of the tracing window for a corresponding step.

10. The method of claim 1, further comprising a step of calibrating means for tracking viewer position, wherein these means comprise the markers, the two optical sensor arrays, the reading and processing devices and the marker 3D coordinates calculation device.

11. The method of claim 1, further comprising a step of detecting interfering emission sources and excluding their effect on the detecting of the markers.

12. The method of claim 1, further comprising a step of synchronizing the optical sensor arrays with each other, prior to the step of obtaining pictures from the two optical sensor arrays.

13. The method of claim 1, further including a step of identifying the markers after the step of determining the 2D coordinates of the markers, wherein the system further comprises a marker identification device.

14. The method of claim 1, further including a step of extrapolating the 2D coordinates of the markers prior to the step of determining the 3D coordinates of the markers.

15. The method of claim 1, further including a step of extrapolating the 3D coordinates of the markers after the step of determining the 3D coordinates of the markers.

16. The method of claim 1, further comprising a step of controlling a tracing window, wherein the system further comprises a third optical sensor array, a third reading and processing device and at least three tracing window control devices.

17. The method of claim 1, wherein displaying the image for each eye of the viewer is performed for more than one viewer.

18. The method of claim 1, wherein the step of detecting the markers in the pictures by processing data obtained from the two optical sensor arrays starts before reading a frame is finished.

19. The method of claim 1, wherein processing data obtained from the two optical sensor arrays is performed in the reading and processing devices in a distributed manner.

20. The method of claim 1, wherein the step of determining the 2D coordinates of the markers is performed with subpixel accuracy.

21. The method of claim 1, wherein the system further comprises a first radio communication device, and the glasses of the system also comprise a second radio communication device and an orientation device, and
wherein data obtained from the orientation device of the glasses via the first and the second radio communication devices is used for determining the 3D coordinates of the markers disposed on the glasses, when determination of the markers by the optical sensor arrays is not possible.

22. The method of claim 1, wherein the system further comprises a first radio communication device and at least one manipulator comprising a second radio communication device and an orientation device, and
wherein data obtained from the orientation device of the manipulator via the first and the second radio communication devices is used for determining the 3D coordinates of the markers disposed on the manipulator, when determination of the markers by the optical sensor arrays is impossible.

23. The method of claim 1, wherein the step of detecting the markers and determining the 2D coordinates of the markers includes the following steps:
selecting lines of the optical sensor array for reading;
reading a selected line of the optical sensor array;
checking if a signal intensity of each pixel in the selected line exceeds a threshold value;
if the pixel signal intensity exceeds the threshold value, detecting the marker picture outline and then passing to a step of calculating size of the marker picture outline;
if the pixel signal intensity does not exceed the threshold value, returning to the step of reading a selected line of the optical sensor array;
calculating size of the marker picture outline;
checking size of the marker picture outline;
if the size of the marker picture outline is within predetermined limits, passing to a step of calculating geometric center of the marker picture outline; if the size of the marker picture outline is not within predetermined limits, passing to a step of excluding the marker picture outline;
calculating geometric center of the marker picture outline;
calculating maximum and minimum radii of the marker picture outline;
checking ratio of the maximum and minimum radii of the marker picture outline;
if the ratio of the maximum and minimum radii of the marker picture outline is within predetermined limits, passing to a step of checking brightness uniformity, if the ratio of the maximum and minimum radii of the marker picture outline is not within predetermined limits, excluding the marker picture outline;
checking brightness uniformity of the area within the marker picture outline;
if the brightness uniformity of the area within the marker picture outline is within predetermined limits, calculating coordinates of weighted center of the marker picture outline, if the brightness uniformity of the area within the marker picture outline is not within predetermined limits, excluding the marker picture outline;
excluding the marker picture outline from further consideration and labelling the marker picture outline;
calculating coordinates of weighted center of the marker picture outline, transferring for a corresponding step at least one of the following: the coordinates of the weighted center of the marker picture outline, the marker picture outline size, and the ratio of the maximal and minimal radii of the marker picture outline, and then labelling the marker picture outline; and
labelling the marker picture outline and excluding the marker picture outline from further analysis of the picture obtained from the optical sensor array.

24. A system for creating a 3D effect of an image formed on a display device surface, the system simultaneously providing at least effects of binocular parallax and motion parallax and comprising:
a display device configured to display a sequence of images;
a pair of glasses configured to provide stereoscopic separation of images, the glasses comprising two optical shutters and two markers;
two optical sensor arrays configured to obtain pictures of the markers;
two reading and processing devices configured to read data from the optical sensor array and to determine 2D coordinates of the markers;
a marker 3D coordinates calculation device configured to calculate 3D coordinates of the markers based on the 2D coordinates of the markers;
a marker coordinates prediction device configured to extrapolate coordinates of the markers so as effective overall delay does not exceed 5 ms;

a 3D scene formation device configured to form a 3D scene considering the 3D coordinates of the markers; and an image output device configured to output the 3D scene image to the display device.

25. The system of claim 24, wherein the markers are light emitting markers.

26. The system of claim 25, wherein the markers are configured to emit IR light.

27. The system of claim 24, further comprising a tracing window control device configured to determine an area of the optical sensor array for reading data therefrom, depending on position of a picture of one of the markers,
wherein size of the area of the optical sensor array is less than a size of an entire frame of the optical sensor array.

28. The system of claim 24, further configured to calibrate viewer tracking means comprising the markers, the two optical sensor arrays, the reading and processing devices and the marker 3D coordinates calculation device.

29. The system of claim 24, further configured to automatically detect and exclude interfering emission sources.

30. The system of claim 24, further comprising a synchronization device configured to provide synchronization of the two optical sensor arrays with each other.

31. The system of claim 24, further comprising a synchronization device configured to provide synchronization of the optical sensor arrays with each other and with the markers.

32. The system of claim 24, further comprising a first communication device, wherein the glasses also comprise a second communication device, the system configured to selectively switch the markers on and off.

33. The system of claim 24, further comprising a marker identification device configured to determine if a marker belongs to a certain device, based on data obtained from the two optical sensor arrays.

34. The system of claim 24, wherein the marker coordinates prediction device is configured to extrapolate the 2D coordinates of the markers.

35. The system of claim 24, wherein the marker coordinates prediction device is configured to extrapolate the 3D coordinates of the markers.

36. The system of claim 24, further comprising a third optical sensor array, a third reading and processing device and at least three tracing window control devices.

37. The system of claim 24, wherein the system is further configured to display three-dimensional objects for more than one viewer.

38. The system of claim 24, wherein the system is further configured to start processing data obtained from the optical sensor array before reading a frame is finished.

39. The system of claim 24, wherein the system is further configured to process data obtained from the optical sensor array in the reading and processing devices in a distributed manner.

40. The system of claim 24, wherein the reading and processing device is configured to determine the 2D coordinates of the markers with subpixel accuracy.

41. The system of claim 24, wherein the glasses comprise a second radio communication device.

42. The system of claim 41, wherein the glasses comprise an orientation device comprising: an accelerometer and/or a magnetometer and/or a gyroscope.

43. The system of claim 42, further comprising a first radio communication device configured to use data obtained from the orientation device of the glasses via the first and second radio communication devices for determination of the 3D coordinates of the markers, when determination of the markers by the optical sensor arrays is impossible.

44. The system of claim 42, further comprising a first radio communication device and a tracing window control device configured to determine an area of the optical sensor array for reading data therefrom,
wherein a size of the area of the optical sensor array is less than size of the entire frame of the optical sensor array, and configured to use data obtained from the orientation device of the glasses via the first and second radio communication devices for determination of a size and position of the tracing window.

45. The system of claim 24, further comprising a manipulator.

46. The system of claim 44, wherein the manipulator comprises a marker.

47. The system of claim 24, further comprising a first radio communication device and a manipulator.

48. The system of claim 47, wherein the manipulator comprises a marker.

49. The system of claim 48, wherein the manipulator comprises a second radio communication device.

50. The system of claim 49, wherein the system is configured to selectively switch the markers on and off.

51. The system of claim 50, wherein the system generates a luminosity map when the markers are switched off, in order to automatically detect interfering emission sources and to exclude their effect.

52. The system of claim 49, wherein the manipulator comprises an orientation device that includes an accelerometer and/or a magnetometer and/or a gyroscope.

53. The system of claim 52, wherein the system is configured to use data obtained from the orientation device for the determination of the 3D coordinates of the markers, when determination of the markers by the optical sensor arrays is not possible.

54. The system of claim 52, further comprising a tracing window control device configured to determine an area of the optical sensor array for reading data therefrom,
wherein a size of the area of the optical sensor array is smaller than a size of the entire frame of the optical sensor array, and configured to use data obtained from the orientation device for determination of a size and position of the tracing window.

55. The system of claim 24, wherein the optical sensor arrays are equipped with narrow-band optical filters.

56. The system of claim 24, wherein the markers are equipped with narrow-band optical filters.

* * * * *